United States Patent
Kataoka et al.

(10) Patent No.: US 6,303,367 B1
(45) Date of Patent: Oct. 16, 2001

(54) METHOD FOR PURIFYING MATTER CONTAMINATED WITH HALOGENATED ORGANIC COMPOUNDS

(75) Inventors: Naoaki Kataoka, Kanagawa-ken; Tatsuo Shimomura, Tokyo; Nobumitsu Kitajima, Kanagawa-ken; Naoki Seki, Kanagawa-ken; Hiroshi Shinmura, Kanagawa-ken, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/355,891

(22) PCT Filed: Jan. 29, 1998

(86) PCT No.: PCT/JP98/00363

§ 371 Date: Oct. 22, 1999

§ 102(e) Date: Oct. 22, 1999

(87) PCT Pub. No.: WO98/34740

PCT Pub. Date: Aug. 13, 1998

(30) Foreign Application Priority Data

| Feb. 7, 1997 | (JP) | 9/025367 |
| Jun. 20, 1997 | (JP) | 9/164399 |
| Aug. 6, 1997 | (JP) | 9/212069 |
| Aug. 6, 1997 | (JP) | 9/274575 |
| Nov. 12, 1997 | (JP) | 9/310599 |
| Dec. 16, 1997 | (JP) | 9/346511 |
| Dec. 25, 1997 | (JP) | 9/357607 |

(51) Int. Cl.$^7$ .................................................. C12S 13/00
(52) U.S. Cl. ........................ 435/262.5; 435/262; 210/610; 210/757
(58) Field of Search ............................... 435/262, 262.5; 210/610, 757; 588/206, 207; 405/128.1, 128.45, 128.5, 128.7, 128.75

(56) References Cited

U.S. PATENT DOCUMENTS

| 5,266,213 | * | 11/1993 | Gillham . |
| 5,362,402 | * | 11/1994 | Haitko et al. . |
| 5,480,579 | * | 1/1996 | Seech et al. . |
| 5,575,927 | * | 11/1996 | Sivavec et al. . |
| 5,975,798 | * | 11/1999 | Liskowitz et al. . |

FOREIGN PATENT DOCUMENTS

| 6-508553 | 9/1994 | (JP) . |
| 7-136632 | 5/1995 | (JP) . |
| 8-510138 | 10/1996 | (JP) . |

* cited by examiner

Primary Examiner—William H. Beisner
(74) Attorney, Agent, or Firm—Wenderoth, Lind & Ponack, L.L.P.

(57) ABSTRACT

A method for purifying matter contaminated with a halogenated organic compound is disclosed. The method includes the step of adding a reducing agent and a nutritional source for a heterotrophic anaerobic microorganism to the contaminated matter. The reducing agent is reduced iron, cast iron, iron-silicon alloy and so on, or a water soluble compound. A combination of chemical reactions with microorganisms allows to decompose the halogenated organic compound. The nutritional source including an organic carbon and 20 to 50 percent by weight of an oxidized form of nitrogen is added, thereby preventing by products of the decomposition such as generation of noxious gases and decoloration of soil. A method includes the steps of mixing a reducing agent and a nutritional liquid with the contaminated matter, wherein the mixing step including a step of adjusting the contaminated matter at pH ranging from 4.5 to 9.0; and keeping the mixture in a condition that air hardly penetrates through a matrix, thereby allowing to uniformly mix a large amount of the contaminated matter.

7 Claims, 2 Drawing Sheets

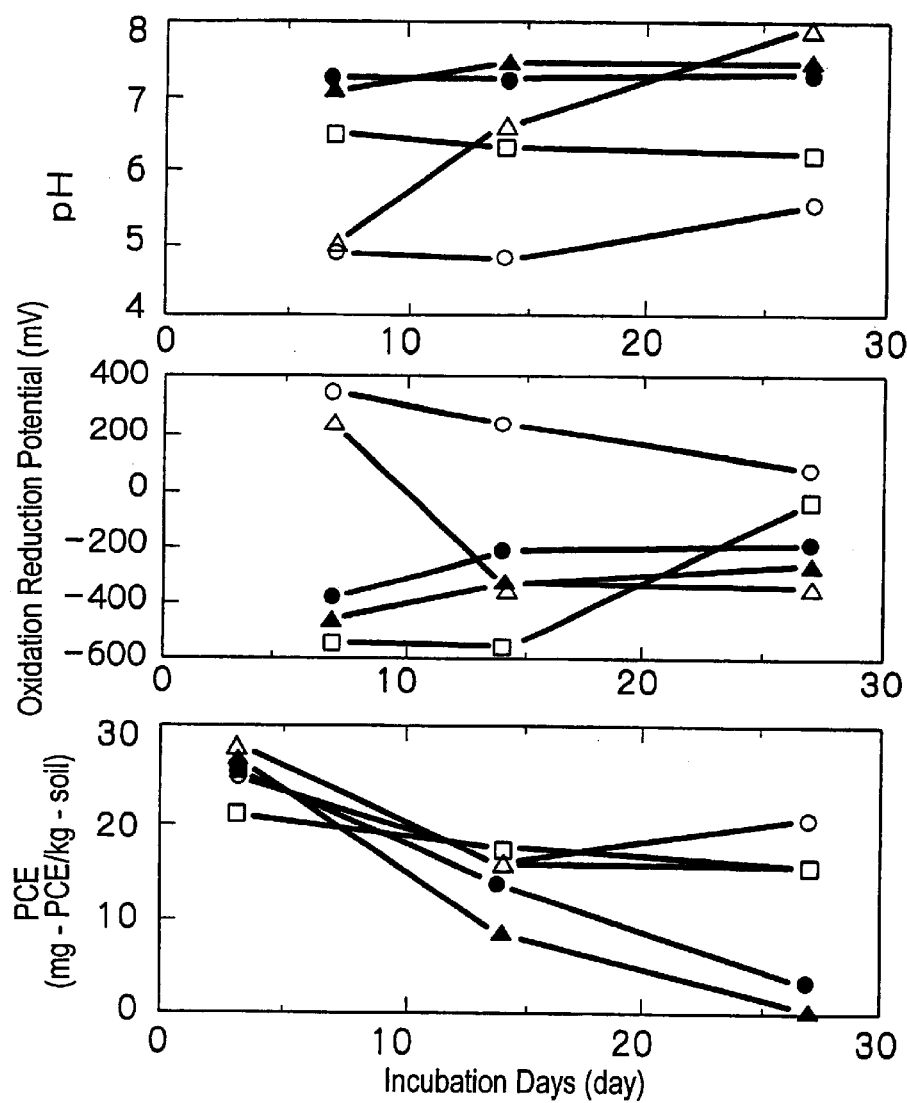

Fig. 1

Reaction Systems Using Medium for Methane Producing Microorganisms

-○- ① Control of contaminated soil
-△- ② Contaminated soil + medium for methane producing microorganisms
-□- ③ Contaminated soil + medium for methane producing microorganisms + reduced iron
-●- ④ Contaminated soil + medium for methane producing microorganisms + reduced iron + mixed lime fertilizer A + compost of bovine droppings + leaf mold
-▲- ⑤ Contaminated soil + medium for methane producing microorganisms + reduced iron + mixed lime fertilizer B + compost of sewage sludge + leaf mold

METHOD FOR PURIFYING MATTER CONTAMINATED WITH HALOGENATED ORGANIC COMPOUNDS

FIELD OF THE INVENTION

The present invention relates to a method for purifying matter such as soil, sediment, sludge and water contaminated with halogenated organic compounds, particularly a chlorinated organic compound. The present invention particularly relates to a method for purifying contaminated matter by reductive dehalogenation combining a chemical reaction with a biological reaction. thereby decomposing the halogenated organic compound.

RELATED ART

Recently, halogenated organic compounds such as tetrachloroethylene, trichloroethylene, 1,1,1-trichloroethane, and dichloroethylene are wide used as a degreasing agent for electronic components and mechanical metal components and a cleaning agent for dry cleaning. Halogenated organic compounds are contaminants in soil and ground water. These halogenated organic compounds do not readily decompose in the natural world and are hardly soluble in water, and therefore tend to accumulate in soil and to penetrate into ground water. Moreover, halogenated organic compounds are known to induce hepatic disorders and cancer. Therefore, it is desirable to decompose halogenated organic compounds such as chlorinated organic compounds in soil and so on.

In these days, bioremediation has been receiving attention to purify soil, ground water and so on contaminated with halogenated organic compounds. Bioremediation is safe and has improved costs to effects. However, the bioremediation requires a long period of time to be effective and there are limits on the kinds and concentrations of substances that can be decomposed. Therefore, we may not necessarily be satisfied with the bioremediation.

The bioremediation includes aerobic decomposition of trichloroethylene with methane assimilating microorganism, toluene/phenol decomposing microorganisms, ammonia oxidizing microorganism and alkene assimilating microorganism, and there are numerous reports on the aerobic decomposition. However, the aerobic decomposition has disadvantages as follows: decomposition reactions are unstable; the range of substances able to be decomposed is very limited; and highly chlorinated compounds such as tetrachloroethylene and carbon tetrachloride cannot be decomposed.

On the other hand, many anaerobic microorganisms have specificity to decompose a wide range of highly chlorinated compounds such as tetrachloroethylene, trichloroethylene, carbon tetrachloride and so on. However, the anaerobic microorganisms have disadvantages in that growth thereof is very slow; and anaerobic microorganisms produce and thus accumulate strongly toxic intermediate metabolites in the process of the anaerobic decomposition (see H. Uchiyama and S. Yagi; Bioscience and industry, Vol. 52, No. 11, pp. 879–884, 1994).

On the other hand, it has been reported that halogenated organic compounds can be decomposed by chemical reactions, and reductive treatment of chlorinated organic compounds with metallic iron has been disclosed (see T. Senzaki; Treatment of Ground Water Contaminated with Chlorinated Organic Compounds—treatment technique with activated carbon carrying metal iron at low temperatures; "PPM" Vol. 26, No. 5, pp. 64–70, 1995). In view of the foregoing, the present inventors tried dechlorination tests wherein metallic iron is added to soil in the absence of a carbon source for a microorganism. However, under conditions that microorganism is not cultivated and particularly conditions that a reductive atmosphere and a neutral condition are not maintained, the present inventors did not observe any dechlorination reaction. Moreover, the addition of an iron salt such as $FeCl_2$, $FeCl_3$ and $FeSO_4$ instead of the metallic iron did not produce the dechlorination reaction, either.

It has been reported that metallic iron and high-pressure air can be injected into soil for reacting iron powder with halogenated organic compounds in the soil to convert into inorganic compounds, thereby detoxifying the same (see Japanese Patent Application Laid Open No. 8-257570). However, the method has disadvantages concerning equipment for injecting air and there is a chance that the halogenated organic compounds may diffuse. Moreover, the use of high-pressure air increases costs, and therefore is not practical.

It has been reported that chlorinated organic compounds contaminating soil and ground water can be removed by combining a natural compound having catalytic activity for dehalogenation with microorganism treatment (see "Nikkei Biotech" published by Nikkei BP Inc., Oct. 7, 1996, No. 361, pp. 14–15). However, the document does not disclose specific natural compounds and the microorganism at all.

U.S. Pat. No. 5,411,664 discloses a method for decomposing halogenated organic compounds by adding fibrous organic matter and multivalent metal particles to a contaminated matter. However, the U.S. patent does not disclose a reducing agent such as reduced iron, cast iron, alloy, a water soluble reducing agent and so on. Moreover, the U.S. patent does not disclose maintaining the contaminated matter in a reductive atmosphere or a specific pH subsequent to adding the reducing agent.

Moreover, depending on the composition of a nutritional source added, biological reductive reactions such as sulfate reduction and methane fermentation may occur, and sulfur-containing noxious gases such as hydrogen sulfide and mercaptan are produced and a combustible gas such as a methane gas may be generated. Moreover, the production of iron sulfide may change color of soil into black. A reaction of metallic powder and water may produce a combustible hydrogen gas.

In a laboratory scale, it is easy to homogeneously mix a reducing agent and a nutritional source with a contaminated matter. However, in order to purify contaminated matter such as soil, in reality, a large amount of reducing agent and the nutritional source would be required, which may warrant engineering works. Moreover, it is not easy to homogeneously mix the contaminated matter in such a large scale. Furthermore, it is expected that mixing conditions may affect a decomposition rate of halogenated organic compounds. Particularly, a special technique is required to purify the contaminated matter having a volume of not less than 1 $m^3$ and particularly not less than 10 $m^3$.

SUMMARY OF THE INVENTION

It is an object of the present intention to provide a method for purifying matter contaminated with a halogenated organic compound by combining chemical reaction with a biological reaction, thereby decomposing the halogenated organic compound.

The first aspect of the present invention has an object of decomposing the halogenated organic compounds by reductive dehalogenation reaction.

The second aspect of the present invention has an object of decomposing the halogenated organic compounds by a chemical dehalogenation reaction.

The third aspect of the present invention has an object of preventing the generation of sulfur-containing noxious gas and combustible gas as well as the excessive decoloration of contaminated matter such as soil, which may occur as a result of by-products of the reductive dehalogenation reaction.

The fourth aspect of the present invention has an object of mixing the reducing agent and the nutritional source with the contaminated matter when the contaminated matter has a large volume.

The first aspect of the present invention is characterized by adding a prescribed reducing agent, thereby promoting the reductive dehalogenation reaction.

The second aspect of the present invention is characterized by adding a prescribed reducing agent, thereby promoting the chemical reductive dehalogenation reaction. Contrary to the first aspect of the present invention, the second aspect need not involve the use of a biological reaction. Use of the prescribed reducing agent allows to decompose halogenated organic compounds solely by chemical reactions.

In the third aspect of the present invention, a nutritional source containing an organic carbon and 20 to 50 percent by weight, based on the organic carbon, of an oxidized form of nitrogen is used so as to change a group of microorganisms involved in reductive dehalogenation reaction, thereby preventing soil from being changed in color to black and noxious gases such as mercaptan from being generated.

The fourth aspect of the present invention is achieved by mixing a reducing agent and a nutritional liquid with a contaminated matter, thereby uniformly mixing thereof, especially when the contaminated matter having a volume of not less than 1 m$^3$ and particularly not less than 10 m$^3$ is purified.

In the third and fourth aspects of the present invention, the reducing agent used in the first and second aspects of the present invention is preferably used but not limited thereto.

According to the first aspect of the present invention, there is provided a method for purifying matter contaminated with a halogenated organic compound, which method comprises the steps of: adding a reducing agent and a nutritional source for a heterotrophic anaerobic microorganism to the contaminated matter, the reducing agent having a standard electrode potential ranging from 130 mV to −2400 mV at 25° C. with respect to the standard hydrogen electrode, the reducing agent is at least one species selected from the group consisting of reduced iron, cast iron, iron-silicon alloy, titanium alloy, zinc alloy, manganese alloy, aluminum alloy, magnesium alloy, calcium alloy and a water soluble compound. The presence of such reducing agent promotes reductive dehalogenation reaction by combination of chemical reactions and microorganisms.

In the present invention, preferably, the reducing agent has the standard electrode potential ranging from −400 mV to −2400 mV at 25° C. with respect to the standard hydrogen electrode, and the reducing agent is at least one species selected from the group consisting of the reduced iron, the cast iron, the iron-silicon alloy, the titanium alloy, the zinc alloy, the manganese alloy, the aluminum alloy, the magnesium alloy, and the calcium alloy. Preferably, the reducing agent comprises the reduced iron. Alternatively, the reducing agent may comprise the cast iron. Alternatively, the reducing agent may be selected from the group consisting of the iron-silicon alloy, titanium-silicon alloy, titanium-aluminum alloy, zinc-aluminum alloy, manganese-magnesium alloy, aluminum-zinc-calcium alloy, aluminum-tin alloy, aluminum-silicon alloy, magnesium-manganese alloy and calcium-silicon alloy.

Preferably, the reducing agent is a water soluble compound. Further preferably, the reducing agent is an organic acid or derivative thereof, hypophosphorous acid or derivative thereof, or a sulfide salt.

Preferably, the reducing agent is a powder having a diameter up to 500 μm. Preferably, the contaminated matter has a water content of at least 25 percent by weight.

Preferably, the method further comprises the step of maintaining the contaminated matter in a pH ranging from 4.5 to 9.0 subsequent to the adding step. Preferably, further comprising the step of maintaining the contaminated matter in a pH ranging from 4.5 to 9.0 under a reducing atmosphere subsequent to the adding step.

Preferably, the method further comprises the steps of adding an organic compost, a compostable organic material, a waste water containing organic matter or a waste containing organic matter to the contaminated matter and mixing thereof.

In the first aspect of the present invention, preferably, the water soluble reducing agent is monocarboxylic acid, dicarboxylic acid, tricarboxylic acid, tetracarboxylic acid or salt thereof, which may have 1 to 20 carbon atoms, and which may be substituted by a hydroxy radical; polyhydroxyaryl; or hypophosphorous acid or salt thereof. Preferably, the water soluble reducing agent is hypophosphorous acid or salt thereof. The reducing agent may be a salt made of the organic acid or the hypophosphorous acid and iron, titanium, zinc, manganese, aluminum, or magnesium.

Preferably, the method further comprises the step of adding at least one of an alkali metal compound and an alkaline earth metal compound to the contaminated matter for adjusting pH thereof. In the maintenance step, preferably, the halogenated organic compound is converted into an organic compound being free of a halogen atom. In the maintenance step, preferably, the halogenated organic compound is converted into a hydrocarbon being free of a halogen atom.

According to the second aspect of the present invention, there is provided a method for purifying matter contaminated with a halogenated organic compound, which method comprises the step of: adding a reducing agent to the contaminated matter, the reducing agent having a standard electrode potential ranging from 130 mV to −2400 mV at 25° C. with respect to the standard hydrogen electrode, the reducing agent is at least one species selected from the group consisting of reduced iron, cast iron, iron-silicon alloy, titanium alloy, zinc alloy, manganese alloy, aluminum alloy, magnesium alloy, calcium alloy and a water soluble compound.

In the second aspect of the present invention, preferably, the reducing agent has the standard electrode potential ranging from −445 mV to −2400 mV at 25° C. with respect to the standard hydrogen electrode, and the reducing agent is at least one species selected from the group consisting of the iron-silicon alloy, the titanium alloy, the zinc alloy, the manganese alloy, the aluminum alloy, the magnesium alloy, and the calcium alloy.

Preferably, the contaminated matter comprises 0.1 g to 100 g of an iron compound based on 1 kg of a dry weight of the contaminated matter. Further preferably, the contaminated matter comprises 1 g to 100 g of an iron compound based on 1 kg of a dry weight of the contaminated matter, and the iron compound comprises iron hydroxide ($Fe(OH)_3$) or triiron tetraoxide ($Fe_3O_4$). Preferably, the reducing agent is at least one species selected from the group consisting of the iron-silicon alloy, titanium-silicon alloy, titanium-aluminum alloy, zinc-aluminum alloy, manganese-magnesium alloy, aluminum-zinc-calcium alloy, aluminum-tin alloy, aluminum-silicon alloy, magnesium-manganese alloy and calcium-silicon alloy.

Alternatively, the reducing agent preferably may be a water soluble compound. Preferably, the reducing agent is an organic acid or derivative thereof, hypophosphorous acid or derivative thereof, or a sulfide salt. Preferably, the reducing agent is a powder having a diameter up to 500 $\mu$m.

According to the third aspect of the present invention, there is provided a method for purifying matter contaminated with a halogenated organic compound, which method comprises the step of: adding a reducing agent and a nutritional source for a heterotrophic anaerobic microorganism to the contaminated matter, the reducing agent having a standard electrode potential ranging from 130 mV to –2400 mV at 25° C. with respect to the standard hydrogen electrode, the nutritional source containing an organic carbon and 20 to 50 percent by weight, based on the organic carbon, of an oxidized form of nitrogen.

Preferably, the nutritional source contains 20 to 30 percent by weight, based on the organic carbon, of the oxidized form of nitrogen. Preferably, the organic carbon is supplied as a water soluble organic carbon source.

Preferably, the reducing agent is a metal having a standard electrode potential ranging from –400 mV to –2400 mV at 25° C. with respect to the standard hydrogen electrode. Preferably, the reducing agent is at least one species selected from the group consisting of reduced iron, cast iron, iron-silicon alloy, titanium alloy, zinc alloy, manganese alloy, aluminum alloy, magnesium alloy, and calcium alloy.

Preferably, the reducing agent is a water soluble compound. Preferably, the reducing agent is a powder having a diameter up to 500 $\mu$m.

In the third aspect of the present invention, preferably, the oxidized form of nitrogen is in a form of a nitrate salt. Preferably, the nitrate salt contains alkali metal nitrate, alkaline earth metal nitrate, iron nitrate, titanium nitrate, zinc nitrate, manganese nitrate, aluminum nitrate or magnesium nitrate. Further preferably, the nitrate salt contains sodium nitrate, potassium nitrate or calcium nitrate.

Preferably, the organic carbon source is a sugar, an organic acid or derivative thereof, lower alcohol, a morasses waste, a liquor waste or a mixture thereof.

According to the fourth aspect of the present invention, there is provided a method of purifying a contaminated matter containing a halogenated compound and a solid matter, which method comprises the step of: mixing a reducing agent and a nutritional liquid containing a nutritional source for a heterotrophic anaerobic microorganism and water with the contaminated matter, the reducing agent having a standard electrode potential ranging from 130 mV to –2400 mV at 25° C. with respect to the standard hydrogen electrode, wherein the mixing step including a step of adjusting the contaminated matter at pH ranging from 4.5 to 9.0; and keeping the mixture in a condition that air hardly penetrates through a matrix.

In the present invention, preferably, the reducing agent may be in a powder form and wherein the nutritional liquid is added to the contaminated matter and mixed thereof, and then the reducing agent is added to the resultant mixture and further mixed thereof.

Preferably, the reducing agent is a powder having a diameter up to 500 $\mu$m.

Preferably, the reducing agent is at least one species selected from the group consisting of reduced iron, cast iron, iron-silicon alloy, titanium alloy, zinc alloy, manganese alloy, aluminum alloy, magnesium alloy and calcium alloy.

Preferably, 1 to 10 percent by volume, based on the contaminated matter, of the nutritional liquid is added to the contaminated matter and mixed thereof as a first step; and then an amount larger than the amount of the first step of the nutritional liquid is added to the contaminated matter and mixed thereof as a second step.

Alternatively, 1 to 5 percent by volume, based on the contaminated matter, of the nutritional liquid may be added to the contaminated matter and mixed thereof as a first step; the nutritional liquid may be added to the contaminated matter and mixed thereof as a second step wherein a sum of the nutritional liquids added in the first step and the second step amounts 5 to 10 percent by volume, based on the contaminated matter, of the contaminated liquid; and the nutritional liquid is added to the contaminated matter and mixed thereof as a third step wherein an amount of the nutritional liquid added in the third step is more than an amount of the nutritional liquid added in either the first step or the second step.

Preferably, the reducing agent is a water soluble compound, and the reducing agent is dissolved in the nutritional liquid. Preferably, in the keeping step the mixture is kept at a temperature ranging from 17° C. to 60° C. for at least initial three days.

In the fourth aspect of the present invention, preferably, in overall, 15 to 25 percent by volume, based on the contaminated matter, of the nutritional liquid is added to the contaminated matter.

Preferably, in the keeping step the mixture is kept at a temperature ranging from 17° C. to 60° C. for at least initial five days. Further preferably, in the keeping step the mixture is kept at a temperature ranging from 20° C. to 40° C. for at least initial three, preferably five days.

Preferably, the keeping step is conducted in a situation that the mixture is separated from the environment. Preferably, the contaminated matter is covered by a material that does not penetrate air so as to maintain a condition that air hardly penetrates through a matrix. Alternatively, the contaminated matter is immersed in an aqueous liquid so as maintain a condition that air hardly penetrates through a matrix. Preferably, the nutritional liquid, the reducing agent and the contaminated matter are mixed in a container.

BRIEF DESCRIPTION OF THE DRAWINGS

FIG. 1 is a graph to show a test result where a soil contaminated by tetrachloroethylene is purified by reductive dehalogenation reaction using a medium for producing methane producing microorganisms under anaerobic conditions in accordance with the present invention.

PREFERRED EMBODIMENTS OF THE INVENTION

Figure 2:
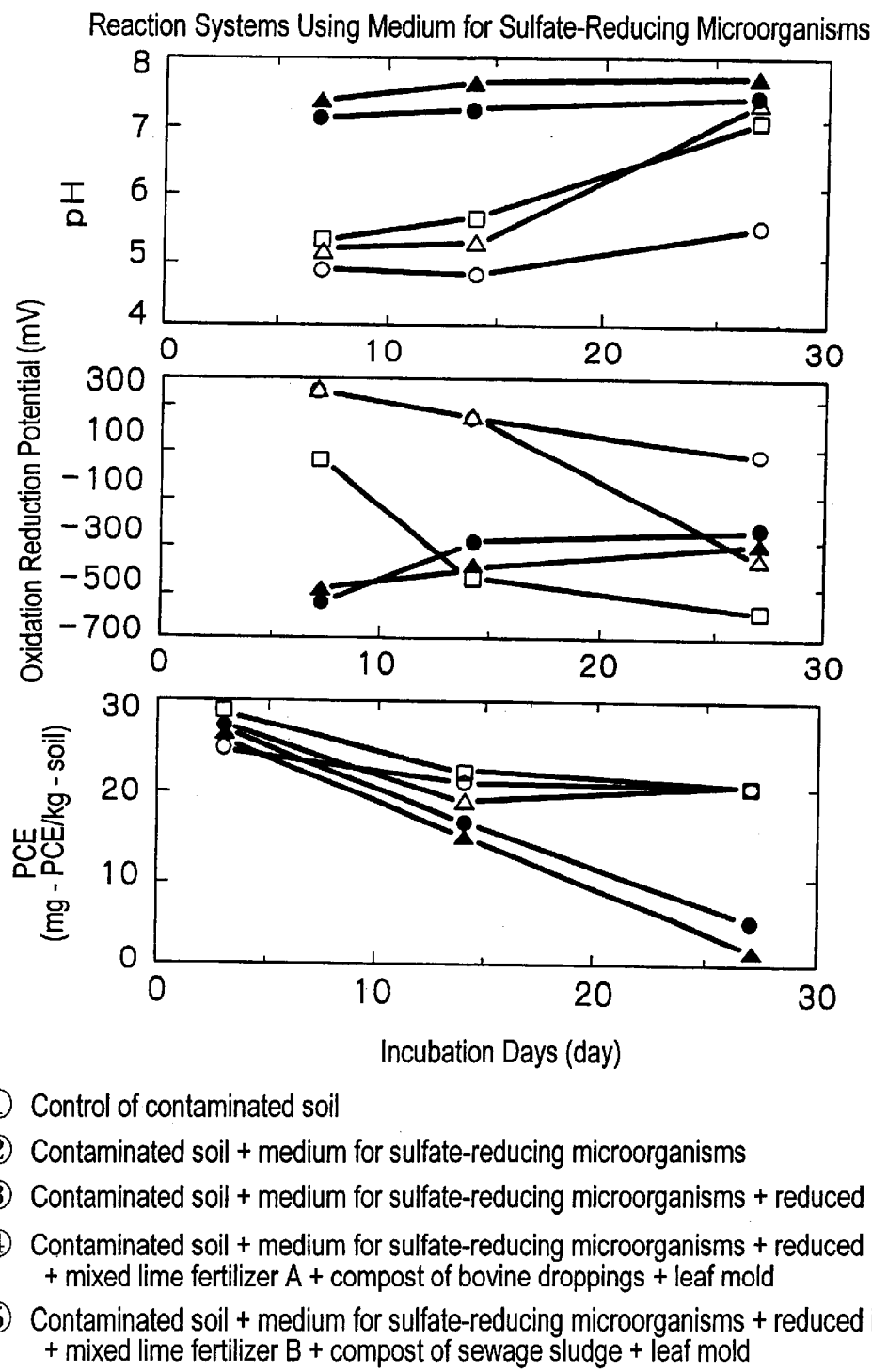
FIG. 2 is a graph to show a test result where a soil contaminated by tetrachloroethylene is purified by dehalogenation reaction using a medium for producing sulfate reducing microorganisms under anaerobic conditions in accordance with the present invention.

According to the first, second and third aspects of the present invention, matter contaminated with a halogenated organic compound is purified. In the present specification, the halogen refers to fluorine, chlorine, bromine, and iodine. In the present invention, matter contaminated with an organic compound containing a halogen atom can be purified, and particularly matter contaminated with an organic compound containing a chlorine atom and a bromine atom can be purified, and more particularly matter contaminated with an organic compound containing a chlorine atom can be purified. A chlorinated organic compound is not limited to an aliphatic compound such as tetrachloroethylene, trichloroethylene, 1,1,1-trichloroethane, dichloroethylene and so on but to include an aromatic compound such as pentachlorophenol.

According to the first, second, third, and fourth aspects of the present invention, contaminated matter such as soil, sediment and sludge may be treated. Moreover, a compost, compostable organic matter, and a waste can be treated. According to the first, second and third aspects of the present invention, an aqueous liquid such as groundwater, and a waste water may be treated. In this specification, the aqueous liquid includes an aqueous solution, a suspension, an emulsion and a mixture thereof.

When the contaminated matter is soil, sediment, sludge and so on, the water content thereof is preferably at least 25 percent by weight, and further preferable from 40 to 60 percent by weight. Under these conditions, air hardly penetrate through the soil, sediment, sludge and so on, thereby proliferating anaerobic microorganism, and therefore these conditions are preferable. The water content thereof in percent is defined as follows:

$$\text{Water Content} = \frac{\text{weight of water therein}}{\text{total weight of contaminated matter containing water}} \times 100$$

When the contaminated matter is water such as groundwater and a waste water, the water content is always at least 25 percent by weight.

According to the first aspect of the present invention, a reducing agent having a standard electrode potential ranging from 130 mV to −2400 mV at 25° C. with respect to the standard hydrogen electrode and a nutritional source for a heterotrophic anaerobic microorganism to the contaminated matter are added to the aforementioned contaminated matter so as to accelerate both chemical reaction and biological reaction, thereby decomposing the halogenated organic compound.

A substance having a standard electrode potential larger than 130 mV may not provide sufficient reducing power. On the other hand, a substance having a standard electrode potential smaller than −2400 mV, for example, alkali metal such as metallic sodium and metallic potassium has too much reducing power, and may violently react with water to produce a hydrogen gas. Therefore, such substance is very dangerous and not preferable. Standard electrode potentials (E°) at 25° C. with respect to the standard hydrogen electrode are shown in the following table.

Standard Electrode Potential (E°) at 25°°C. with respect to Standard Hydrogen Electrode

| Electrode Reactions | E° (mV) |
| --- | --- |
| $Ca^{2+} + 2e^- \Leftrightarrow Ca$ | −2865 |
| $Na^+ + e^- \Leftrightarrow Na$ | −2714 |
| $Mg^{2+} + 2e^- \Leftrightarrow Mg$ | −2363 |
| $Al^{3+} + 3e^- \Leftrightarrow Al$ | −1662 |
| $Zn^{2+} + 2e^- \Leftrightarrow Zn$ | −763 |
| $Fe^{2+} + 2e^- \Leftrightarrow Fe$ | −440 |
| $Cd^{2+} + 2e^- \Leftrightarrow Cd$ | −403 |
| $Ni^{2+} + 2e^- \Leftrightarrow Ni$ | −250 |
| $Sn^{2+} + 2e^- \Leftrightarrow Sn$ | −136 |
| $Fe^{3+} + 3e^- \Leftrightarrow Fe$ | −36 |
| $2H^+ + 2e^- \Leftrightarrow H_2$ | 0 |
| ascorbic acid(pH 7.0) | 58 |

The standard electrode potential is equal to the standard potential E° and is determined with respect to a hydrogen electrode serving as a comparing electrode when all of the chemical species involved in a cell reaction are standard states such as pure solid state, standard concentrations, standard pressures and so on. The standard electrode potential is calculated by a formula as follows:

$$E° = -\Delta G°/nF$$

wherein ΔG° refers to a change of a standard Gibbs free energy in the cell reaction;

n is the number of electrons involved in the reaction; and

F is the Faraday constant.

Usually, the potential for oxidation and reduction may be expressed by a potential determined by a saturated silver chloride electrode serving as a comparing electrode. The potential for oxidation and reduction is smaller than the standard electrode using the standard hydrogen electrode serving as the comparing electrode by about 200 mV.

In the present invention, the reducing agent is at least one species selected from the group consisting of reduced iron, cast iron, iron-silicon alloy, titanium alloy, zinc alloy, manganese alloy, aluminum alloy, magnesium alloy, calcium alloy and a water soluble compound.

Preferably, the reducing agent is a metallic substance having the standard electrode potential ranging from −400 mV to −2400 mV at 25° C. with respect to the standard hydrogen electrode.

In one embodiment of the present invention, the reduced iron is used as the reducing agent. Usually, surfaces of an iron powder is oxidized to form an oxidized coating. On the other hand, the reduced iron has much less oxidized coating, is prone to oxidation, and has higher reactivity.

The reduced iron refers to a species of metallic iron produced by reduction of an oxide, and the reduced iron is very fine powder and very prone to oxidation ("Encyclopedia of Chemistry" edited by Committee of Editing Encyclopedia of Chemistry, Kyoritsu Publishing Company). Typically, the reduced iron is reduced by a hydrogen gas at high temperatures. Iron oxide may be reduced, but the oxide is not limited to iron oxide. The reduced iron may have an Fe content more than 90 percent. For example, such reduced iron is available from Wako Pure Chemical Industries, Ltd.

According to another embodiment of the present invention, cast iron is preferably used as the reducing agent. Cast iron is both safe and easy to treat. Moreover, cast iron allows a high rate of purification to be achieved. A shaved scrap from a cast iron product, that is, scrap cast iron is further preferable for use since scrap cast iron can be recycled.

Generally, iron ore is reduced to produce a pig iron, and impurities are removed from the pig iron to provide an iron material for further use in industry. An iron material having up to about 2 percent by weight of carbon concentration is called steel, and an iron material having more than about 2 percent by weight of carbon concentration is called cast iron ("Science and Chemistry Dictionary", the fourth edition, Iwanami Publishing House, 1987, page 411). Steel has superior mechanical strength, and processed in a variety of manufactures. We investigated the use of shaved scrap steel in purifying matter contaminated by a halogenated organic compound. However, oil is used in shaving, and therefore the shaved scrap from a steel product contains an oil. When such shaved scrap is used in purifying a contaminated matter, there is a chance that the oil might produce a secondary contamination. On the other hand, no oil is used during shaving cast iron used in casting, and therefore, cast iron scrap will not produce secondary contamination, being contrary to the scrap of the steel product.

According to another aspect of the present invention, an alloy is used as the reducing agent. Specifically, an iron-silicon alloy, a titanium alloy, a zinc alloy, a manganese alloy, an aluminum alloy, a magnesium alloy, and a calcium alloy are used also. The titanium alloy includes, for example, a titanium-silicon alloy and a titanium-aluminum alloy. The zinc alloy includes, for example, a zinc-aluminum alloy. The manganese alloy includes, for example, a manganese-magnesium alloy. The aluminum alloy includes, for example, an aluminum-zinc-calcium alloy, an aluminum-tin alloy, an aluminum-silicon alloy. The magnesium alloy includes, for example, a magnesium-manganese alloy. The calcium alloy includes, for example, a calcium-silicon alloy.

Functions of the reducing agent are explained in the case of the reduced iron as an example. According to a report by Senzaki concerning an anaerobic dehalogenation by metallic a iron ("Treating Groundwater Contaminated by Organic Chlorinated Compound, Treatment Technique at Low Temperatures by Activated Carbon Carrying Metallic Iron" PPM, 1995, Vol. 26, No. 5, pages 64 to 70), the halogenated organic compound is adsorbed onto a surface of the reduced iron, and surfaces of the reduced iron are polarized to produce anodes and cathodes depending on conditions of the metal and the environment. Accordingly, iron dissolves into iron ions at the anodes while electrons flow into cathodes so that reductive reactions such as dehalogenation reactions occur at the cathodes.

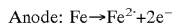

Anode: $Fe \rightarrow Fe^{2-} + 2e^-$

As aforementioned, the cast iron has more than 2 percent by weight of carbon concentration, and typically contains 3 to 3.5 percent by weight and 13 to 14 percent of carbon as graphite. The scrap cast iron is generally pulverized by a mill prior to being discharged as a waste. During the pulverization, a part of the graphite is removed and adhere to a surface of a powder of the cast iron. Therefore, when the powder of the cast iron is coated by a water film, the graphite may serve as the cathode, and the iron may serve as the anode. As a result, an electric current may flow as aforementioned, and the iron may dissolve at the anode and a reduction reaction such as a dehalogenation reaction may occur at the cathode.

An alloy having a stronger reduction power than metallic iron more easily maintains a reducing atmosphere, have increased potential difference from the halogenated organic compound, and accelerate the dehalogenation reaction.

Use of an alloy such as the magnesium-manganese alloy, the zinc-aluminum alloy, the aluminum-zinc-calcium alloy, the aluminum-tin alloy and so on, may not form an oxide coating or a corrosion product adhered onto the alloy surface. Although such coating is coated onto the surface of the alloy, the coating is not dense or passivated and does not impede the dehalogenation reaction. Therefore, the reduction reaction does not decrease the contact efficiency, and the purification reaction remains efficient.

According to another embodiment of the present invention, preferably, the reducing agent is a water soluble compound. Compared to adding a solid such as powder, the contact efficiency with the halogenated organic compound significantly increases, thereby accelerating the dehalogenation reaction. Moreover, the water soluble reducing agent is capable of penetrating soils and so on, and the reducing agent can be injected through an injecting well so that digging may not be required. Furthermore, when reducing conditions become unstable during a purification operation, an exuded water from the contaminated matter may be recovered, the water soluble reducing agent may be added thereto, and then the mixture may be injected again, thereby easily recovering the reducing condition.

The water soluble reducing agent may include an organic acid or derivative thereof, hypophosphorous acid or derivative thereof, and a sulfide salt. The organic acid includes carboxylic acid, sulfonic acid, phenol or derivative thereof. The carboxylic acid includes monocarboxylic acid, dicarboxylic acid, tricarboxylic acid, tetracarboxylic acid or salt thereof, which may have 1 to 20 carbon atoms, and which may be substituted by a hydroxy radical. For example, the carboxylic acid includes formic acid, acetic acid, citric acid, oxalic acid, terephthalic acid, and so on, and an aliphatic dicarboxylic acid having 2 to 10 carbon atoms such as citric acid and oxalic acid are particularly preferable.

As the phenol derivative, polyhydroxyaryl is preferable. The polyhydroxyaryl refers to aryl having a plurality of hydroxy groups substituted thereby, and aryl includes, for example, benzene, naphthalene, anthracene, and so on. Like naphthalene and indene, a fuzed ring may be formed. As the polyhydroxyaryl, 1,2,3-trihydroxybenze, 1,4-dihydroxybenzene are preferable. 1,2,3-trihydroxybenze is called pryogallol or pyrogallic acid also. Its alkaline solution reacts with an oxygen gas to produce an oxide.

The derivative of the organic acid includes, for example, salt, ester, amide, anhydride and so on, and the salt is preferable. The counter ion is not limited and include an inorganic ion and an organic ion such as tetraalkyl ammonium ion. The inorganic ion includes an alkali metal ion such as sodium ion; an alkaline earth metal ion such as calcium ion; and a transition metal ion such as iron ion, titanium ion.

The derivative of hypophosphorous acid includes, for example, salt, ester, and so on, and the salt is preferable. The counter ion is not limited and include an inorganic ion and an organic ion such as tetraalkyl ammonium ion. The inorganic ion includes an alkali metal ion such as sodium ion; an alkaline earth metal ion such as calcium ion; and a transition metal ion such as iron ion, titanium ion.

The reducing agent may be a salt made of the organic acid or the hypophosphorous acid and iron, titanium, zinc, manganese, aluminum, or magnesium.

Addition of the aforementioned reducing agent does not produce or accumulate an intermediate metabolite such as vinyl chloride, which was reported in many of anaerobic dehalogenation reaction, and the reaction products are converted to a substance that is completely dehalogenated and released to a gas phase. Use of a reducing agent having the standard electrode potential being equal to or smaller than metallic iron increases potential difference from the halogenated organic compound, thereby accelerating dehalogenation reaction. Therefore, its use is preferable.

When the contaminated matter is soil, an amount of the reducing agent is preferably from 0.01 to 20 gram and further preferably from 0.05 to 10 gram per 100 gram of the soil. When the contaminated matter is water, an amount of the reducing agent is preferably from 0.1 to 30 gram and further preferably 0.2 to 20 gram per 100 milliliters of water. In either case, when the contaminated matter has a concentration of the halogenated compound, which is an object of dehalogenation, more than 50 milligram per kilogram or 50 milligram per liter, an amount of the reducing agent such as a metallic powder may be required to increase by 0.05 to 0.1 gram per 1 milligram of the halogenated organic compound. However, these values apply in ideal conditions, and there are cases in an actual contaminated site where microorganisms do not consume oxygen as expected and thus the reducing power of the reducing agent is consumed in vain. Moreover, the reducing power of the reducing agent can be easily consumed by supply of water from rain and an oxygen gas in air. Therefore, in practicing the present invention, a preliminary test on site should be conducted, and concentrations of the reducing agent should be determined, depending on conditions on the site.

Preferably, the reducing agent is in a form of powder or a solution for increasing contact efficiency of the reducing agent with the contaminated matter. However, most of the aforementioned reducing agent may react with water to easily form an oxidized compound. In these cases, preferably, the reducing agent may be directly mixed with the contaminated matter. Alternatively, the reducing agent may be dissolved into water immediately before mixing with the contaminated matter.

When the reducing agent is in a form of powder, preferably, the powder has a diameter up to 500 $\mu$m. Smaller diameters increase the decomposition rate of the halogenated organic compound.

In some applications, the reducing is preferably a powder having a diameter ranging from 0.001 millimeter to 5 millimeters and further preferably a powder having a diameter ranging from 0.01 millimeter to 1 millimeter. The diameter of the powder may control a rate of chemical reduction reaction: as the diameter of the powder increases, the rate of the reduction reaction per unit weight of the reducing agent may decrease. When the reducing agent is a metallic substance and has a diameter more than 5 millimeter, surfaces of the metal particle may be coated by a relatively thick oxide coating, the central part of the metal, which remains reduced, might not be used up. On the other hand, when the diameter is less than 0.001 millimeter, the rate of oxidation reaction is extremely fast: during transportation or mixing the reducing agent may contact with water and result in oxidation prior to use. When the reducing agent is a metallic substance, oxidation in a surface of the powder may not affect oxidation of the inner part, which is not oxidized yet.

The heterotrophic anaerobic microorganism include, for example, methane producing microorganism such as those in the genera Methanosaroina, Methanothrix, Methanobacterium, and Methanobrevibacter; sulfate reducing microorganism such as those in the genera Desulfovibrio, Desulfotomaculum, Desulfobacterium, Desulfobacter, Desulfococcus; acid producing microorganism such as those in the genera Clostridium, Acetivibrio, Bacteroides, Ruminococcus, and facultative anaerobic microorganism such as those in the genera Bacillus, Lactobacillus, Aeromonas, Streptococcus, Micrococcus.

Microorganism in Bacillus, Pseudomonas, Aeromonas, Streptococcus, Micrococcus have an activity for reducing oxidized form of nitrogen, and therefore they are preferable.

Nutrition sources of the heterotrophic anaerobic microorganism is selected depending on characteristics of microorganisms in the contaminated matter. For example, one of a medium for methane producing microorganism, a medium for sulfate reducing microorganism, and a medium for nitrate reducing microorganism may be selected. In the selection, a purification tractability test may be conducted for each medium to investigate a purification rate of the halogenated organic compound.

For the methane producing microorganism, nutritional sources generally known as the nutritional sources for the growth of methane producing microorganisms may be used, such as lactic acid, methanol, ethanol, acetic acid, citric acid, pyruvic acid and polypeptone. For the sulfate reducing microorganisms, nutritional sources generally known as the nutritional sources for the growth of sulfate reducing microorganisms may be used, such as lactic acid, methanol, ethanol, acetic acid, citric acid, pyruvic acid, polypeptone and an organic matter containing a sugar.

Moreover, the nutritional sources for the growth of the heterotrophic anaerobic microorganisms include organic waste, which may be either liquid or solid, and which is an object of purification by methane fermentation. For example, such wastes include a waste water from beer brewing, a waste water from starch production, a waste water from dairy farming, beer lees, a refuse of tofu or been curd, and a sludge.

When an excess amount of a liquid medium for microorganisms is added to the contaminated matter, the halogenated organic compound may further penetrate into the ground to aggravate the contamination. On the other hand, when too small an amount is added, sufficient water content for the growth of microorganisms may not be achieved and the growth may be retarded. In view of the foregoing, the liquid medium for microorganisms may be added so that a water content in the soil becomes 25 to 60 percent and preferably 35 to 60 percent. This ratio apply to sludge also. An amount of the medium for microorganisms to be added may be determined by considering a water content of the soil, a ratio of pores in the soil, distribution of particle diameters of the soil, and coefficients of water permeability through the soil. Therefore, both the concentrations and the amount of the medium for microorganisms may vary, depending on conditions of contaminated soil, and determined by the results of the purification tractability test.

It is effective to add diatomaceous earth or other water holding materials, leaf mold or the like to soil for maintaining a water content of the soil.

When the contaminated matter is substance which has low water permeability such as clay soil, hardened siltstone, the dechlorination treatment using only the reducing agent may have low contact efficiency, and it may take a long time, and the reducing condition may become unstable by supply of oxides from an ambient. In this case, an addition of organic carbons, which serve as growth substance for microorganisms, in addition to the reducing agent stabilize the reducing atmosphere in a neutral condition, thereby decomposing halogenated organic compound.

In the present invention, after adding the reducing agent to the contaminated matter, preferably, the contaminated matter is maintained under a reducing atmosphere. The reducing atmosphere includes, for example, an oxygen gas in air is blocked by water and so on. The heterotrophic anaerobic microorganism may involve in decomposition of the halogenated organic compound, and the presence of the oxygen gas and so on may impede growth of such microorganisms. The oxidation of the reducing agent facilitates to achieve the reducing atmosphere. After completely consuming the reducing agent, there may be cases that the reducing atmosphere can not be maintained any longer.

Such reducing atmosphere preferably refers to a standard electrode potential ranging from +200 mV to −2400 mV, further preferably ranging from +200 mV to −1000 mV, and furthermore preferably ranging from +100 mV to −600 mV at 25° C. with respect to the standard hydrogen electrode.

In the present invention, while the reductive dehalogenation reaction proceeds, preferably, a prescribed pH is maintained. Specifically, pH of 5.8 to 8.5 is preferable, and pH of 6 to 8 is further preferable, and pH of 6.2 to 7.6 is furthermore preferable. When the prescribed pH and anaerobic environment are maintained, an activity for dehalogenation reaction on the surfaces of the reducing agent can be maintained to be high.

A pH adjusting agent may be added to the contaminated matter. When the contaminated matter is acidic soil, preferably, the pH adjusting agent includes an alkali metal compound and an alkaline earth metal compound. The pH adjusting agent may be conventional inorganic soil improvers and include, for example, limestone, quick lime, slaked lime, calcium sulfate or gypsum, magnesium oxide, bentonite, pearlite, zeolite, and so on.

Preferably, various compost and compostable organic materials are added to the contaminated matter to promote the reaction in the treatment. The addition encompass adding microorganisms, adding nutritional sources, and promote holding water in the system. These may be conventional organic soil improvers.

It is believed that the composts or compostable organic materials may serve as nutritional sources for microorganisms, may ensure the anaerobic environment around microorganisms, and may serve to decompose and remove sulfur containing noxious gases such as hydrogen sulfide and methylmercaptan, which result from anaerobic fermentation of soil.

It has been known that various composts contain fungi, bacteria and many other various microorganisms, which include microorganisms being capable of efficiently decomposing sulfur containing noxious substances. A number of microorganisms useful for deodorizing have been isolated from a variety of composts, and the composts are utilized for removing noxious odors in treating droppings from domestic animals. In view of the foregoing, the use of composts or compostable organic materials is preferable.

In the aforementioned conditions, the addition of inorganic substances, which serves as pH adjusting agents and may be referred to as inorganic soil improvers, such as alkali metal compounds and alkaline earth compounds; organic substances or organic soil improvers; and a medium for microorganisms to soil initiates growth of anaerobic microorganisms being present in the soil and forms a neutral and anaerobic environment in the soil. Therefore, the reduced iron, which is responsible for chemical dehalogenation reaction in accordance with the present invention, may be mixed to the soil at the same time that the inorganic substances, the organic substances and the medium for microorganisms are added thereto. Rather, the simultaneous addition is preferable for ensuing to maintain an anaerobic condition for a long period of time and for reducing cost, thereby facilitating the process control.

When the reductive dehalogenation in accordance with the present invention is practiced in actual contaminated site in the field, it is unnecessary to build large equipment. Various soil improvers and the reducing agent are mixed with the contaminated soil to be purified, and then a medium for growth of microorganisms is added to the mixture, and the area to be purified is covered with a polyvinyl sheet or the like so that: water does not evaporate therefrom; that rain does not penetrate into the soil; and that the area is kept warm. If desired, preferably, the surface of the soil of the area to be purified may be covered with leaf mold or compost for preventing release of noxious gases from the soil and the evaporation of water therefrom.

A reaction mechanism of the reductive dehalogenation reaction has not been completely clarified. However, the present inventors speculate the reaction mechanism as follows. Firstly, inorganic substances, organic substances, and medium for microorganisms, which serve as an agent for activating microorganisms, are added to the soil for ensuring pH 4.5 to 9.0 in the contaminated matter and for forming an anaerobic environment by utilizing growth of the microorganisms in the soil. The anaerobic environment in the contaminated matter such as soil may correspond to a standard electrode potential ranging from +200 mV to −2400 mV at 25° C. with respect to the standard hydrogen electrode. In this case, the anaerobic microorganisms in the soil rapidly grow and do not impede chemical dehalogenation reaction, and therefore biological dehalogenation reaction and chemical dehalogenation reaction proceed substantially at the same time.

The mechanism for biological anaerobic dehalogenation has not been clarified since it has not been sufficiently investigated from the view point of microbiology and enzymology. However, since it has been reported that strict anaerobic microorganisms such as methane producing microorganisms and sulfate reducing microorganisms and anaerobic microorganisms in a variety of anaerobic sludge and sediments undergoes a slow, microbiological dechlorination reaction of removing chlorine atoms one by one in anaerobic conditions, and therefore, it is believed that similar, mild reductive dehalogenation reaction proceed in accordance with the present invention.

In the present invention, during an initial state of a period of about one month from the beginning of the purification, chemical dehalogenation reactions may predominate. Subsequently, as a concentration of the contaminating halogenated organic compounds decreases and as the reducing agent decreases its reducing activity, the chemical dehalogenation reactions diminishes, and alternatively, biological dehalogenation reactions slowly become predominant, thereby further proceeding dehalogenation reactions. When the biological dehalogenation reactions are beginning to occur, the concentration of contaminating halogenated organic compounds have significantly decreased, and therefore, it does not impede biological dehalogenation reactions. Actually, the biological reactions are suitable for purifying a contaminated matter having a small concentration of halogenated organic compound, and the biological reactions proceed more active in the small concentration. Therefore, a method for purifying matter contaminated with halogenated organic compound in accordance with the present invention allows purification of the contaminated matter to extremely low concentrations by interaction of chemical dehalogenation reactions and biological dehalogenation reactions.

According to the chemical and biological, anaerobic dechlorination of the present invention, a combination of inorganic substances and organic substances, which may serve as soil improvers, and some of which may be hardly soluble in water, prevents release of the halogenated organic compound from the contaminated soil and allows to keep an appropriate water holding ability so that the halogenated organic compound does not penetrate into further depth in the ground, thereby purifying the contaminated soil by the halogenated organic compound for a short period of time with small cost.

The dechlorination reaction of the present invention can proceed until organic compounds being completely free of chlorine atom are obtained as main products, and this is preferable in view of completely purifying the matter contaminated with halogenated organic compounds. For example, in purifying matter contaminated with tetrachloroethylene and trichloroethylene, organic compounds being completely free of chlorine atom, which are main products, are ethylene and ethane, and an intermediate containing a chlorine atom is hardly produced. Therefore, the result is very preferable.

In the second aspect of the present invention, the reducing agent of the first aspect of the present invention is used. In the second aspect of the present invention, a prescribed nutritional source may not be added, and the biological reaction may not be involved. Still, the second aspect of the present invention allows to decompose the halogenated organic compound.

In accordance with the second aspect of the present invention, preferably, the reducing agent has the standard electrode potential ranging from −445 mV to −2400 mV at 25° C. with respect to the standard hydrogen electrode, and the reducing agent is at least one species selected from the group consisting of the iron-silicon alloy, the titanium alloy, the zinc alloy, the manganese alloy, the aluminum alloy, the magnesium alloy, and the calcium alloy. The aforementioned reducing agents have an improved reducing power. Therefore, when the contaminated matter such as a soil contains an iron compound, particularly, an iron compound of the second valence or the third valence, there are possibilities that these iron compounds are reduced to an iron, thereby involving the dehalogenation reactions.

In view of the foregoing, preferably, the contaminated matter comprises 0.1 g to 100 g of an iron compound based on 1 kg of a dry weight of the contaminated matter, and, further preferably, the contaminated matter comprises 1 g to 100 g of an iron compound based on 1 kg of a dry weight of the contaminated matter, and the iron compound comprises iron hydroxide ($Fe(OH)_3$) or triiron tetraoxide ($Fe_3O_4$). The iron compound may further contain an iron oxide, such as $FeO$, $Fe_2O_3$ and the like as well as iron chloride. Preferably, the reducing agent has the standard electrode potential ranging from −450 mV to −2400 mV at 25° C. with respect to the standard hydrogen electrode. Alternatively, the reducing agent may be a water soluble compound.

The reducing agent which is used in the third and fourth aspects of the present invention is explained hereinafter. In the third aspect and fourth aspect of the present invention, the reducing agent having a standard electrode potential ranging from 130 mV to −2400 mV at 25° C. with respect to the standard hydrogen electrode is used. The reducing agent used in the first aspect and the second aspect of the present invention is preferably used.

However, the reducing agent used in the third aspect and fourth aspect of the present invention is not limited to the reducing agent used in the first aspect and the second aspect of the present invention and include, for example, iron, which is not limited to the reduced iron and the cast iron, manganese, nickel, magnesium and copper. A large amount of metallic iron and metallic manganese are present in a form of oxides in the natural soil, and therefore the addition thereof hardly influence the ecosystem and may be safe. Moreover, metallic iron and metallic manganese are commercially available, and its access is convenient. An amount of the reducing agent in used is the same as aforementioned.

Preferably, the reducing agent used in the third aspect and fourth aspect of the present invention is a metal having a standard electrode potential ranging from −400 mV to −2400 mV at 25° C. with respect to the standard hydrogen electrode. Preferably, the reducing agent is at least one species selected from the group consisting of reduced iron, cast iron, iron-silicon alloy, titanium alloy, zinc alloy, manganese alloy, aluminum alloy, magnesium alloy, calcium alloy and a water soluble compound.

Alternatively, the reducing agent is a water soluble compound. Preferably, the reducing agent is a powder having a diameter up to 500 $\mu$m.

The third aspect of the present invention is mainly explained hereinafter. However, disclosure being the same as the first aspect of the present invention is omitted.

The third aspect of the present invention includes a step of adding a reducing agent and a nutritional source for a heterotrophic anaerobic microorganism to the contaminated matter, the reducing agent having a standard electrode potential ranging from 130 mV to −2400 mV at 25° C. with respect to the standard hydrogen electrode, thereby decomposing the halogenated organic compound by reductive dehalogenation, as aforementioned.

In the third aspect of the present invention, the nutritional source contains an organic carbon and 20 to 50 percent by weight, and preferably 20 to 30 percent by weight, based on the organic carbon, of an oxidized form of nitrogen. Consequently, in decomposing the halogenated organic compound, a group of microorganisms involved in reductive dehalogenation reaction changes, thereby preventing the soil from changing its color into black by iron sulfate and noxious gases such as mercaptan from generating. When the oxidized form of nitrogen is a nitrate salt, for example, an amount of the oxidized form of nitrogen refers to a weight of the nitrogen atoms in the nitrate salt. Similarly, an amount of the organic carbon refers to a weight of the carbon atoms in the organic matter.

Depending on the compositions of the nutritional source added, the reductive dehalogenation reactions involve biological reduction reactions such as reducing sulfate and methane fermentation in the soil, and there are chances that noxious gases such as hydrogen sulfide and mercaptan are produced and that a combustible gas such as a methane gas may be generated. Moreover, a reaction of metallic powder and water in reducing conditions may produce a combustible hydrogen gas. Furthermore, sulfate reducing may produce iron sulfide, which may change color of soil into black.

However, the presence of 20 to 50 percent by weight, based on the organic carbon. of an oxidized form of nitrogen can prevent the aforementioned reactions. Tests using soils have confirmed that the organic carbon, which serves as a growth substrate, is predominantly utilized by microorganisms having an activity of reducing oxidized form of nitrogen, and reactions such as methane fermentation and sulfur reduction are impeded. Nitrogen gas mainly generates from the soil. Even though a hydrogen gas generates, the hydrogen gas is diluted by the nitrogen gas, thereby eliminating a risk of explosion. Moreover, the nutritional source being free of a salt containing sulfur or sulfate further ensures to prevent the generation of sulfur containing gases such as hydrogen sulfide and mercaptan and of iron sulfide.

When an excess amount of the oxidized form of nitrogen is added to the contaminated matter, the oxidized form of nitrogen remains even after consuming the organic carbon, and therefore it is difficult to maintain a sufficiently reducing atmosphere. For example, an oxidation reduction potential with respect to the saturated silver chloride electrode may decrease to about +100 mV, and the reductive dehalogenation reactions may hardly proceed. On the other hand, only a very small amount oxidized form of nitrogen is added compared to an amount of the organic carbon added, the oxidized form of nitrogen may be consumed up in an early stage by generation of the nitrogen gas, and subsequently, standard biological dehalogenation reactions such as methane fermentation may occur. Therefore, it is important to adjust a ratio of the organic carbon and the oxidized form of nitrogen.

*Alcaligenes eutrophus* and *Paracoccus denitrificans* are microorganisms having an activity of reducing oxidized form of nitrogen, and the microorganisms in an aqueous solution consumes 40 to 50 percent by weight of the oxidized form of nitrogen based on the organic carbon. However, the present inventors conducted reduction reactions in accordance with the present invention in a variety of soils by using indigenous microorganisms, and the results show that the addition of 20 to 50 percent by weight and preferably 20 to 30 percent by weight, based on the organic carbon, of an oxidized form of nitrogen does not generate methane and sulfur containing noxious gases and consumes the oxidized form of nitrogen salts and achieves the complete dehalogenation of the halogenated organic compounds.

Conventionally, it has been reported that the addition of the oxidized form of nitrogen impedes the reductive dehalogenation reactions (Fujita et al., Proc. of $8^{th}$ International Conf. on Anaerobic Digestion, 1997, Vol. 2, pages 492 to 499). However, the present invention adjusts a ratio of the organic carbon and the oxidized form of nitrogen, thereby growing microorganisms having an activity of reducing oxidized form of nitrogen and preventing the generation of the sulfur containing noxious gases and the combustible gas such as the hydrogen gas, as well as maintaining the reduction conditions in the contaminated matter and allowing to perform efficient dehalogenation reactions. Therefore, the third aspect of the present invention relates to a novel purification method, which surpasses conventional wisdom.

Preferably, the oxidized form of nitrogen is in a form of a nitrate salt. Preferably, the nitrate salt contains alkali metal nitrate, alkaline earth metal nitrate, iron nitrate, titanium nitrate, zinc nitrate, manganese nitrate, aluminum nitrate or magnesium nitrate. Further preferably, the nitrate salt contains sodium nitrate, potassium nitrate or calcium nitrate.

In the present invention, preferably, the organic carbon is supplied as a water soluble organic carbon source. The features are not necessarily limited to the third aspect of the present invention, and may be applied to the first and fourth aspects of the present invention also. Preferably, the water soluble organic carbon source is a sugar, an organic acid or derivative thereof, lower alcohol, a morasses waste, a liquor waste or a mixture thereof. The organic carbon serves as a growth substrate for growing microorganisms. The organic carbon may come from sugars such as glucose, cane sugar; an organic acid or a salt thereof such as acetic acid, citric acid, and lactic acid; and an organic waste liquid or an organic waste such as a morasses waste; a liquor waste, beer lees, a refuse of tofu or been curd. An amount of the organic carbon to be added is selected, depending on the oxidizing power of the contaminated matter and a concentration of the contaminating halogenated organic compounds. When the contaminated matter is a standard soil, about 1 gram of the organic carbon per one kilogram of the soil may be necessary to maintain reducing conditions. When the contaminated matter has a concentration of the halogenated compound, which is an object of dehalogenation, more than 50 milligram per kilogram, an amount of the organic carbon may be required to increase by 10 to 20 milligram per 1 milligram of the halogenated organic compound. However, these values may merely rough estimates, and there are cases in an actual contaminated site that the organic carbons and the reducing power of the reducing agent is consumed by not only the oxidizing power of the contaminated matter but also the supply of water from rain and an oxygen gas in air. Therefore, in practicing the present invention, a preliminary test on site should be conducted, and concentrations of the reducing agent should be determined, depending on conditions on the site.

The fourth aspect of the present invention provides a method of purifying a contaminated matter containing a halogenated compound and a solid matter. The fourth aspect of the present invention includes the step of mixing a prescribed reducing agent and a prescribed nutritional liquid with the contaminated matter, and the mixing step includes a step of adjusting the contaminated matter at pH ranging from 4.5 to 9.0.

In the present invention, preferably, the reducing agent may be in a powder form and wherein the nutritional liquid is added to the contaminated matter and mixed thereof, and then the reducing agent is added to the resultant mixture and further mixed thereof. The features allow to prevent the oxidation of the reducing agent by the nutritional liquid, and the reducing power of the reducing agent can be exerted in the contaminated matter.

Alternatively, the reducing agent may be a water soluble compound, and the reducing agent may be dissolved in the nutritional liquid. The features allow to practice the present invention much easier than a solid reducing agent in the contaminated site. Moreover, the features allow to store and transport a large amount of the nutritional liquid much easily. The nutritional liquid containing the reducing agent is preferably stored in a closed vessel for preventing the oxidation of the reducing agent during storage.

Alternatively, in the mixing step, the nutritional liquid may be divided to at least two portions, and each portion may be added to the contaminated matter one by one. When a large amount of nutritional liquid is mixed with soil, for example, it is difficult to apply sheer force onto lumps of soil in the liquid, and the lumps of soil may move in the liquid without breaking the lumps of soil. On the other hand, when only a small amount of nutritional liquid is added, it is much easier to apply sheer force onto lumps of soil for breaking the lumps, thereby allowing uniform mixing. Subsequently, a larger amount of the nutritional liquid may be added thereto. In one embodiment, preferably, 1 to 10 percent by volume, based on the contaminated matter, of the nutritional liquid may be added to the contaminated matter and mixed thereof as a first step; and then an amount larger than the amount of the first step of the nutritional liquid may be added to the contaminated matter and mixed thereof as a second step. In another embodiment, preferably, 1 to 5 percent by volume, based on the contaminated matter, of the nutritional liquid may be added to the contaminated matter and mixed thereof as a first step; the nutritional liquid may be added to the contaminated matter and mixed thereof as a second step wherein a sum of the nutritional liquids added in the first step and the second step amounts 5 to 10 percent by volume, based on the contaminated matter, of the contaminated liquid; and the nutritional liquid is added to the contaminated matter and mixed thereof as a third step wherein an amount of the nutritional liquid added in the third step is more than an amount of the nutritional liquid added in either the first step or the second step. In either embodiment, only a small amount of the nutritional liquid is added in the first step so that the sheer force is applied to the mixture, thereby facilitating a uniform mixture. In either embodiment, in overall 15 to 25 percent by volume, based on the contaminated matter. of the nutritional liquid may preferably be added to the contaminated matter. With regard to "in overall, " when the nutritional liquid is added to the contaminated matter by a plurality of times, the sum of all the nutritional liquid are referred to.

Subsequently, the mixture is kept in a condition that air hardly penetrates through a matrix. In the keeping step, the reductive dehalogenation reaction removes the halogenated organic compound. For example, the mixture may be kept at least two weeks, and preferably at least one month.

The keeping step is preferably carried out in a state where the mixture is isolated from the surroundings for preventing the halogenated organic compounds in the mixture from diffusing into or permeating through the surroundings.

Preferably, the contaminated matter is covered by a material that does not penetrate so as to maintain a condition that air hardly penetrates through a matrix. For example, the soil may be covered by a polyvinyl sheet, thereby promoting growth of the anaerobic microorganisms. Alternatively, the contaminated matter may be immersed in an aqueous liquid so as maintain a condition that air hardly penetrates through a matrix.

Preferably, in the keeping step, the mixture is kept at a temperature ranging from 17° C. to 60° C. for at least initial three days. There period allows to particularly promote the growth of microorganisms in the mixture, increasing concentrations thereof. Preferably, in the keeping step, the mixture may be kept at a temperature ranging from 17° C. to 60° C. for at least initial five days. Further preferably, in the keeping step the mixture is kept at a temperature ranging from 20° C. to 40° C. for at least initial three, preferably five days.

EXAMPLE

The present invention is explained by way of examples hereinafter. However, the present invention is not limited by these examples.

Tests for purifying tetrachloroethylene in examples in accordance with the present invention used a medium for methane producing microorganisms of Table 1 or a medium for sulfate reducing microorganisms of Table 2 as a medium for microorganisms. These purification tests are performed at room temperatures ranging from 12 to 23° C.

Prior to determining its pH, each soil sample was adjusted to have a ratio of the soil sample/pure water of being 1/1 by weight, and determined by a pH meter, HM-5B model produced by Toa Denpa Kogyo KK. Prior to determining an oxidation reduction potential with respect to the saturated silver chloride electrode, each soil sample was adjusted to have a ratio of soil sample/oxygen-free water of being 1/1 by weight. An oxidation reduction potential meter ODIC-3 model produced by Toa Denpa Kogyo KK was used, An ORP composite electrode, PS-8160 model was dipped in the conditioned soil sample for 30 minutes, and thereafter the ORP value of the sample was measured.

To analyze ethylene chlorides present in soil, the method developed by the Yokohama National University (see K. Miyamoto et al.; "A Determination Method of Volatile Organic Pollutants in Soil", the Journal of Japan Society on Water Environment, Vol. 18, No. 6, pp. 477–488, 1995). Specifically, each soil sample was dipped in ethanol to extract ethylene and so on therefrom, and then the ethylene and so on obtained were further extracted with decane, and the solution of ethylene in decane was loaded into a column of Hitachi's G-5000 model for gas chromatography, in which the ethylene was analyzed by an FID detector Ethylene chloride gas generated in the gas phase was analyzed also. The gas phase comprising the generated ethylene chloride gas was loaded into a column of gas chromatography, and the ethylene gases were analyzed by using an FID detector. The column was 20 percent TCP Chromosorb WAW DMCS, and the gas chromatography was Hitachi's G-5000 model. To determine ethylene and ethane gases generated in the gas phase, the gas phase comprising the gases was loaded into a column of Porapack Q column of Hitachi's G-5000 model for gas chromatography, in which said gases were analyzed by using an FID detector. To determine hydrogen, carbon dioxide and methane gases generated in the gas phases, GL Sciences Gas Chromatography 320 model and TCD detector were used with active carbon 30/60 or Molecular Sieve 13 X.

As reduced iron, Wako first class reduced iron, product code 096-00785 from Wako Pure Chemical Industries Ltd., Japan was used. Unless stated other wise, the reduce iron was powder.

Example 1

In Example 1, a powder of the reduced iron was used as the reducing agent.

A contaminated soil collected from a surface layer of contaminated soil in a factory A was used. The contaminant in the contaminated soil was mainly tetrachloroethylene, and 25 mg of tetrachloroethylene was present in 1 kg of dry contaminated soil. 30 gram of the contaminated soil was added to each of fourteen vials of a volume of 125 ml. The 14 samples were tested under 14 different experimental conditions, and changes over a period were determined concerning pH of the contaminated soil, an oxidation reduction potential with respect to the saturated silver chloride electrode thereof, and a decrease in tetrachloroethylene. The water content of each test system ranges from 48 to 53 percent. During the preparation of the sample in each vial and after collecting the sample in the vial, the gas phase of the vial was replaced with a nitrogen gas.

The contaminated soil samples originated from a loam bed, of which the physical characteristics were such that the water content was 47 percent, the coefficient of water permeability was from $10^{-4}$ to $10^{-5}$ cm/sec, the pH was 6.6, and the oxidation reduction potential with respect to the saturated silver chloride electrode was 380 mV. Test Conditions:

A. Reaction systems using a medium for methane producing microorganisms of Table 1:
  ① Control of contaminated soil only
  ② Contaminated soil+medium for methane producing microorganism (9.0 ml)
  ③ Contaminated soil+medium for methane producing microorganism (9.0 ml)+reduced iron (1.0 g)
  ④ Contaminated soil+medium for methane producing microorganism (9.0 ml)+reduced iron (1.0 g)+mixed lime fertilizer A consisting essentially of limestone (1.0 g)+compost of bovine droppings (1.0 g)+leaf mold (0.5 g)

⑤ Contaminated soil+methane producing medium (9.0 ml)+reduced iron (1.0 g)+mixed lime fertilizer B consisting essentially of limestone and Azumin (1.0 g)+compost of sewage sludge (1.0 g)+leaf mold(0.5 g)

⑥ Contaminated soil+methane producing medium (9.0 ml)+reduced iron (1.0 g)+mixed shell fossil fertilizer consisting essentially of shell fossil (1.0 g)+compost of sewage sludge (1.0 g)+leaf mold (0.5 g)

⑦ Contaminated soil+methane producing medium (9.0 ml)+reduced iron (1.0 g)+mixed lime fertilizer A (1.0 g)+leaf mold (1.0 g) "Azumin" used herein is a fertilizer containing humic acid and magnesia, which comprises humic acid (50 to 60%), magnesia (15%), total nitrogen (3%) and silicic acid (3%).

TABLE 1

Medium for Methane Producing Microorganisms

| Component | Amount |
| --- | --- |
| Tap Water | 800 ml |
| Mineral Solution 1* | 50 ml/liter |
| Mineral Solution 2* | 50 ml/liter |
| Trace Mineral Solution* | 10 ml/liter |
| Trace Vitamin Solution* | 10 ml/liter |
| $NaHCO_3$ | 5.0 g/liter |
| Yeast Extract | 1.0 g/liter |
| Polypeptone | 20 g/liter |
| Glucose | 25 g/liter |
| Sodium Citrate | 25 g/liter |
| Methanol | 50 ml/liter |
| L-cysteine HCl Solution | 5.0 ml/liter |
| $Na_2S \cdot 9H_2O$ Solution | 5.0 ml/liter |
| pH | 6.9–7.2 |

*The Mineral Solution 1 refers to a solution containing 6 gram of $K_2HPO_4$ in 1 liter of distilled water.
*The Mineral Solution 2 refers to a solution containing 6 gram of $KH_2PO_4$, 6 gram of $(NH_4)_2(SO_4)$, 12 gram of NaCl, 2.6 gram of $MgSO_4 \cdot 7H_2O$ and 0.16 gram of $CaCl_2 \cdot 2H_2O$ in 1 liter of distilled water.
*The Trace Mineral Solution refers to a solution containing 1.5 gram of nitrilotriacetic acid, 3.0 gram of $MgSO_4 \cdot 7H_2O$, 0.5 gram of $MnSO_4 \cdot 2H_2O$, 1.0 gram of NaCl, 0.1 gram of $FeSO_4 \cdot 7H_2O$. 0.1 gram of $CoSO_4$ or $CoCl_2$, 0.1 gram of $CaCl_2 \cdot 2H_2O$, 0.1 gram of $ZnSO_4$ $7H_2O$, 0.01 gram of $CuSO4$, 0.01 gram of $AlK (SO_4)_2$ , 0.01 gram of $H_3BO_3$, and 0.01 gram of $Na_2MoO_4 \cdot 2H_2O$ in 1 liter of distilled water. The nitrilotriacetic acid was dissolved while the solution was maintained at pH of 6.5 by KOH. and then the other minerals were added. Finally, pH of the solution was adjusted to 7.0 by KOH.
*The Trace Vitamin Solution refers to a solution containing 2 mg of biotin, 2 mg of folic acid, 10 mg of pyridoxine · HCl, 5 mg of thiamine · HCl, 5 mg of riboflavin, 5 mg of nicotinic acid, 5 mg of calcium DL-pantothenate, 0.1 mg of vitamin $B_{12}$, 5 mg of p-aminobenzoic acid, and 5 mg of lipoic acid.

Each of the aforementioned test condition refers to a reaction system, and its meaning in the case of ④ is exemplified as follows:

To a 125-ml vial were added 30 g of a contaminated soil sample, 1.0 g of reduced iron and 1.0 g of mixed lime fertilizer A, and a mixture was mixed. To the resulting mixture was added 9.0 ml of the medium for methane producing microorganisms as shown in Table 1, and thereafter added 1.0 g of compost of bovine droppings and 0.5 g of leaf mold. After the mixture was mixed in the vial, the vial was hermetically sealed with a butyl rubber stopper and an aluminum seal. A series of the aforementioned procedures for preparing the samples were carried out speedily without an interval.

The thus-prepared seven sample were stored. As shown in FIG. 1, the tetrachloroethylene content of each sample was measured on day 3, and the pH value and the oxidation-reduction potential with respect to the saturated hydrogen chloride electrode thereof were measured on day 7. The time intervals for the measurement are shown as in FIG. 1.

B. Reaction systems using a medium for sulfate-reducing microorganisms of Table 2:

① Control of contaminated soil only
② Contaminated soil+medium for sulfate-reducing microorganisms (9.0 ml)
③ Contaminated soil+medium for sulfate-reducing microorganisms (9.0 ml)+reduced iron (1.0 g)
④ Contaminated soil+medium for sulfate-reducing microorganisms (9.0 ml)+reduced iron (1.0 g)+mixed lime fertilizer A consisting essentially of limestone (1.0 g)+compost of bovine droppings (1.0 g)+leaf mold (0.5 g)
⑤ Contaminated soil+medium for sulfate-reducing microorganisms (9.0 ml)+reduced iron (1.0 g)+mixed lime fertilizer B consisting essentially of limestone and Azumin (1.0 g)+compost of sewage sludge (1.0 g)+leaf mold (0.5 g)
⑥ Contaminated soil+medium for sulfate-reducing microorganisms (9.0 ml)+reduced iron (1.0 g)+mixed shell fossil fertilizer consisting essentially of shell fossil (1.0 g)+compost of sewage sludge (1.0 g)+leaf mold (0.5 g)
⑦ Contaminated soil+medium for sulfate-reducing microorganisms (9.0 ml)+reduced iron (1.0 g)+mixed lime fertilizer A consisting essentially of limestone (1.0 g)+leaf mold (1.0 g)

TABLE 2

Medium for sulfate-Reducing Microorganisms

| Component | Amount |
| --- | --- |
| Tap Water | 1000 ml |
| $K_2HPO_4$ | 0.5 g/liter |
| $NH_4Cl$ | 1.0 g/liter |
| $Na_2SO_4$ | 1.0 g/liter |
| $CaCl_2 \cdot 2H_2O$ | 0.1 g/liter |
| $MgSO_4 \cdot 7H_2O$ | 2.0 g/liter |
| Yeast Extract | 1.0 g/liter |
| $FeSO_4 \cdot 7H_2O$ | 0.2 g/liter |
| Trace Vitamin Solution* | 10 ml/liter |
| Sodium Lactate | 25 ml/liter |
| Sodium Acetate | 25 ml/liter |
| Sodium Thioglycolate | 0.1 g/liter |
| Ascorbic Acid | 0.1 g/liter |
| pH | 6.6–7.0 |

*The Trace Vitamin Solution is the same as that in Table 1.

The test results of Example 1 are shown in FIG. 1 and FIG. 2. With regard to reaction systems A-6 and A-7 as well as reaction systems B-6 and B-7, tetrachloroethylene decreased in the same way as A-4 and A-5 as well as reaction systems B-4 and B-5, and therefore, the results of the reaction systems A-6, A-7, B-6 and B-7 were omitted in FIGS. 1 and 2.

The results show that the addition of reduced iron, inorganic fertilizer and the compost along with either the medium for methane producing microorganisms or the medium for sulfate reducing microorganisms to the contaminated soil maintains a neutral atmosphere of about pH 7 and an anaerobic environment, thereby efficiently decomposing tetrachloroethylene. FIG. 1 and FIG. 2 show that the addition of the medium for methane producing microorganisms or the medium for sulfate reducing microorganisms alone to the contaminated soil hardly decompose tetrachloroethylene. When slaked lime was used instead of the mixed lime fertilizer A, the similar result was obtained.

Example 2

In Example 2, a powder of the reduced iron was used as the reducing agent. In control, iron (II) chloride or iron (III) sulfate was used.

To the tetrachloroethylene contaminated soil collected from the factory A as in Example 1 was added tetrachloroethylene to adjust a final concentration of tetrachloroethylene of about 75 milligram per 1 kg of the dry soil. Similar to Example 1, 30 gram of the contaminated soil was added to each of vials of a volume of 125 ml. The samples were tested under 8 different experimental conditions, and changes over a period were determined concerning pH of the contaminated soil, an oxidation reduction potential with respect to the saturated silver chloride electrode thereof, and a decrease in tetrachloroethylene. The water content of each test system ranges from 48 to 53 percent. In reaction systems A-4 and B-4, the contaminated soil, compost of sewage sludge and leaf mold were sterilized with steam in an autoclave for 60 minutes, thereby sterilizing microorganisms originated therefrom. These tests show the influence of the microorganisms in decomposing tetrachloroethylene.

During the preparation of the sample, the gas phase of the vial was replaced with a nitrogen gas. Test Conditions A. Reaction systems using the medium for methane producing microorganisms (Table 1):

① Contaminated soil+methane producing medium (9.0 ml)+reduced iron (1.0 g)+mixed lime fertilizer B consisting essentially of limestone and Azumin (1.0 g)+compost of sewage sludge (1.0 g)+leaf mold (0.5 g)

② Contaminated soil+methane producing medium (9.0 ml)+$FeCl_2$ (1.0 g)+mixed lime fertilizer B consisting essentially of limestone and Azumin (1.0 g)+compost of sewage sludge (1.0 g)+leaf mold (0.5 g)

③ Contaminated soil+methane producing medium (9.0 ml)+$FeSO_4$ (1.0 g)+mixed lime fertilizer B consisting essentially of limestone and Azumin (1.0 g)+compost of sewage sludge (1.0 g)+leaf mold (0.5 g)

④ Sterilized contaminated soil+methane producing medium (9.0 ml)+reduced iron (1.0 g)+mixed lime fertilizer B consisting essentially of limestone and Azumin (1.0 g)+sterilized compost of sewage sludge (1.0 g)+sterilized leaf mold (0.5 g)

B. Reaction systems using the medium for sulfate-reducing microorganisms (Table 2):

① Contaminated soil+sulfate-reducing medium (9.0 ml)+reduced iron (1.0 g)+mixed lime fertilizer B consisting essentially of limestone and Azumin (1.0 g)+compost of sewage sludge (1.0 g)+leaf mold (0.5 g)

② Contaminated soil+sulfate-reducing medium (9.0 ml)+$FeCl_2$ (1.0 g)+mixed lime fertilizer B consisting essentially of limestone and Azumin (1.0 g)+compost of sewage sludge (1.0 g) leaf mold (0.5 g)

③ Contaminated soil+sulfate-reducing medium (9.0 ml)+$FeSO_4$ (1.0 g)+mixed lime fertilizer B consisting essentially of limestone and Azumin (1.0 g)+compost of sewage sludge (1.0 g)+leaf mold (0.5 g)

④ Sterilized contaminated soil+sulfate-reducing medium (9.0 ml)+reduced iron (1.0 g)+mixed lime fertilizer B consisting essentially of limestone and Azumin (1.0 g)+sterilized compost of sewage sludge (1.0 g)+sterilized leaf mold (0.5 g)

The results of Example 2 are shown in Table 3 and Table 4.

Tables 3 and 4 show that the reduced iron decomposes tetrachloroethylene. Namely, the addition of the reduced iron, inorganic fertilizer, serving as a pH adjusting agent, and a compost to the contaminated soil, and further addition of either the medium for methane producing microorganisms or the medium for sulfate reducing microorganisms to the mixture stably ensure the neutral atmosphere of about pH 7 in an anaerobic atmosphere, thereby decomposing tetrachloroethylene in the soil. In contrast, the addition of $FeCl_2$ or $FeSO_4$ instead of the reduced iron to the contaminated soil hardly decompose tetrachloroethylene. Namely, a ferrous salt such as $FeSO_4$ and a ferric salt such as $FeCl_3$ do not decompose tetrachloroethylene.

Where the microorganisms in the reactions systems were sterilized in reaction systems A-4 and B-4, only a small amount of tetrachloroethylene was decomposed. The result suggests that reductive dehalogenation reactions in accordance with the present invention proceeds synergistically with biological reactions and chemical reactions.

Table 4 shows the result of the analysis of the gas components formed in the vials in reactions systems A-1 and B-1. In both reaction systems, large amounts of hydrogen, carbon dioxide, ethylene and ethane gases were formed. In reaction systems A-1 and B-1, only an extremely trance amounts of tetrachloroethylene and cis-DCE were detected. Vinyl chloride is hardly detected, and the accumulation thereof was not observed. In calculating the balance of the reactions in the reaction systems A-1 and B-1, among a decomposed amount of the tetrachloroethylene in the soil, about 71 percent and about 58 percent of the tetrachloroethylene are converted into ethylene and ethane, respectively.

When an animal compost was used instead of the sewage sludge compost, similar results were obtained.

TABLE 3

Results of Anaerobic Dehalogenation of Highly-Contaminated Soil
(incubated for 55 days)

| Tested Matters | Blank | ① Reduced iron | ② $FeCl_2$ | ③ $FeSO_4$ | ④ Sterilized |
|---|---|---|---|---|---|
| [A] Medium for Methane producing Microorganisms | | | | | |
| pH | 5.31 | 7.19 | 4.98 | 6.91 | 7.30 |
| ORP* | 266 | −288 | 90 | −189 | −47 |
| PCE** | 75 | 0.5 | 67 | 58 | 46 |
| [B] Medium for Sulfate-Reducing Microorganisms | | | | | |
| pH | 5.31 | 7.55 | 4.89 | 7.39 | 7.36 |
| ORP* | 266 | −414 | 109 | 138 | −52 |
| PCE** | 75 | 6 | 61 | 51 | 55 |

Unit:
*ORP: mV
**PCE: mg-PCE/1 kg of dry soil

TABLE 4

Gases Resulting from Anaerobic Dehalogenation of Tetrachloroethylene
(incubated for 55 days)

| | $H_2$ | $CO_2$ | $CH_4$ | Ethylene | Ethane |
|---|---|---|---|---|---|
| Unit | ml/kg-dry soil | | | $\mu$mol/kg-dry soil | |
| Blank | 0 | 30 | 0 | 0 | 0 |
| Test A-① | 1270 | 1890 | Trace | 172 | 146 |
| Test B-② | 770 | 1850 | 0 | 138 | 101 |

Tetrachloroethylene was not decomposed into dichloroethylene or vinyl chloride but into ethylene and ethane.

Example 3

In Example 3, the reduced iron was used as the reducing agent.

Sludge samples, X and Y, were collected from a bottom of a lake and from a surface of, swamp, respectively. The lake and the swamp are adjacent to an industrial area. Tetrachloroethylene was added to the sludge samples to adjust a final concentration of 35 milligram of tetrachloroethylene in 1 kg of dry sludge. 15 kg of each of the contaminated sludge samples was added to a cylinder made of stainless steel and having a volume of 25 liter. The cylinder has a diameter of 300 mm and a height of 370 mm. Four experimental groups including a control group of the sample X, a purification group of the sample X, a control group of the sample Y, and a purification group of the sample Y were prepared. The experimental conditions of the experimental groups are as follows. The containers were covered by covers for preventing water evaporation therefrom and entering any external water thereinto and for insulating the content of the cylinder. It is not essential to apply a compost and/or leaf mold onto a surface of each sludge sample, and therefore, the compost and the leaf mold were omitted. These four groups were set in open air, and time-dependent variations in pH values, the oxidation reduction potential with respect to saturated silver chloride electrode, a decrease in tetrachloroethylene were determined. During the test, temperatures in open air varied within the range of 7 to 18° C. The water content of each sludge sample ranges from about 41 to 50 percent.

Reaction Systems

Control group of the X system: contaminated sludge and 3000 ml of pure water.

Purification group of X system: contaminated sludge, 3200 ml of a waste water from saccharified beer lees, 500 gram of reduced iron, 500 gram of mixed lime fertilizer B containing limestones and Azumin as main ingredients, 500 gram of compost from sewage sludge, and 250 gram of leaf mold.

Control group of the Y system: contaminated sludge and 3300 ml of pure water.

Purification group of the Y system: contaminated sludge, 3500 ml of the waste water from saccharified beer lees, 500 gram of reduced iron, 500 gram of mixed lime fertilizer B containing limestones and Azumin as main ingredients, 500 gram of compost from sewage sludge, and 250 gram of leaf mold.

The waste water from saccharified beer lees contains 9600 milligram per liter of reducing sugar, 180 milligram per liter of acetic acid, 3100 milligram per liter of lactic acid, and 8100 milligram per liter of a solid suspension. The waste water has biochemical oxygen demand of 12700 milligram per liter, and a concentration of the total organic carbon content of 5100 milligram per liter.

The result of the change in a concentration of tetrachloroethylene is shown in Table 5. With regard to pH and the oxidation reduction potentials (ORP) with respect to the saturated silver chloride electrode, both of the control groups of the system X and the system Y had pH of from 4.6 to 5.3 and ORP of from 180 to 300 mV, while the purification groups of the system X and the system Y had pH of from 7 to 7.4 and ORP of from 400 to −570 mV. The results show that a purification method in accordance with the present invention allows that both the purification groups X and Y decompose tetrachloroethylene.

TABLE 5

Changed of Concentrations of Tetrachloroethylene in Sediment (unit: mg/1 kg of dry sediment)

|  | Day 0 | Day 19 | Day 28 | Day 40 | Day 57 |
| --- | --- | --- | --- | --- | --- |
| Control of X system | 33 | 30 | 28 | 29 | 30 |
| Purified Area of X system | 28 | 9.3 | 5.9 | 2.7 | 1.8 |

TABLE 5-continued

Changed of Concentrations of Tetrachloroethylene in Sediment (unit: mg/1 kg of dry sediment)

|  | Day 0 | Day 19 | Day 28 | Day 40 | Day 57 |
| --- | --- | --- | --- | --- | --- |
| Control of Y system | 35 | 28 | 30 | 27 | 29 |
| Purified Area of Y system | 31 | 16 | 10.6 | 6.1 | 3.3 |

According to the present invention, the combination of biological reactions and anaerobic biological reactions allows to rapidly and conveniently purify matter such as soil, groundwater and so on contaminated with halogenated compounds. The method of the present invention purifies the contaminated matter without releasing halogenated compounds therefrom. For example, where soil is contaminated, the water holding ability can be suitably adjusted so that halogenated organic compounds do not penetrate into further depth in the ground.

The present invention allows to decompose the halogenated organic compounds into organic compounds free of a halogen atom such as ethylene and ethane. Therefore, the present invention is free from the problem of accumulating harmful intermediates.

Example 4

In Example 4, reduced iron or cast iron was used as the reducing agent.

In the tests for purifying tetrachloroethylene in soil in Example 4, a medium for methane producing microorganisms of Table 6 was used. The oxidation reduction potential of Example 4 was determined when a platinum electrode was used as the metallic electrode and the saturated silver chloride electrode was used as the comparing electrode.

TABLE 6

Medium for Methane Producing Microorganisms

| Component | Amount |
| --- | --- |
| Tap water | 880 ml |
| Mineral Solution 1* | 50 ml/l |
| Mineral Solution 2* | 50 ml/l |
| Trace Mineral Solution* | 10 ml/l |
| Trace Vitamin Solution* | 10 ml/l |
| $NaHCO_3$ | 5.0 g/l |
| Yeast Extract | 1.0 g/l |
| polypepetone | 2.0 g/l |
| glucose | 2.5 g/l |
| sodium citrate | 2.5 g/l |
| methanol | 50 ml/l |
| L-cysteine chloride | 0.1 g/l |
| $Na_2S \cdot 9H_2O$ | 0.1 g/l |
| pH | 6.9 ~ 7.2 |

The Mineral Solution 1, the Mineral Solution 2, the Trace Mineral Solution, and the Trace Vitamin Solution are the same as those used in Table 1.

A contaminated soil collected from a surface layer of contaminated soil in a factory A was used. In the contaminated soil, 25 mg of tetrachloroethylene was present in 1 kg of dry contaminated soil. 30 gram of the contaminated soil was added to each of vials having a volume of 125 ml, and the medium for methane producing microorganisms, either reduced iron or scrap cast iron, a compost from sewage sludge were added to the vial in conditions mentioned below, and the decomposition of tetrachloroethylene was determined. Amounts of the reduced iron, the scrap cast iron, and the compost from sewage sludge added to the contaminated soil were 5 percent by weight. The scrap cast iron was screened to separate scrap cast iron A having a diameter up to 500 micrometers, scrap cast iron B having a diameter from 500 to 800 micrometer, and scrap cast iron C having a diameter not less than 800 micrometer. During the preparation of the sample in each vial, the gas phase of the vial was replaced with a nitrogen gas.

The water content of the soil in each test system ranges from 48.4 to 48.9 percent. The water content herein is a value equal to (weight of water therein) divided by (a total weight of the wet contaminated matter) multiplied by 100.

In the experiments, the samples were incubated for 60 days. Changes over a period were determined concerning pH of the contaminated soil, an oxidation reduction potential with respect to the saturated silver chloride electrode thereof, a decrease in tetrachloroethylene and amounts of ethylene, ethane, hydrogen, carbon dioxide, and methane formed in the gas phase.

The reduced iron used in Example 4 is commercially available from Wako Pure Chemical Industries Ltd., as aforementioned.

Test Conditions 4-1; Control of contaminated soil (30 g) (comparative example)

4-2: Contaminated soil (30 g), a medium for methane producing microorganism (9.0 ml), reduced iron (1.5 g), and a compost of sewage sludge (1.5 g)

4-3: Contaminated soil (30 g), a medium for methane producing microorganism (9.0 ml), scrap cast iron A (1.5 g), and a compost of sewage sludge (1.5 g)

4-4: Contaminated soil (30 g), a medium for methane producing microorganism (9.0 ml), scrap cast iron B (1.5 g). and a compost of sewage sludge (1.5 g)

4-5: Contaminated soil (30 g), a medium for methane producing microorganism (9.0 ml), scrap cast iron C (1.5 g), and a compost of sewage sludge (1.5 g)

The results of Example 4 are shown in Tables 7 and 8.

Table 7 shows a concentration of tetrachloroethylene in soil when purified by scrap cast iron and so on.

Table 8 shows amounts of gases generated when purified by scrap cast iron and so on.

TABLE 7

Results of Purifying Tetrachloroethylene in Soil by Scrap Cast Iron and so on
(after 60 days of incubation)

|  | PCE[a] (mg/kg)[b] | pH | ORP (mV) |
|---|---|---|---|
| 4-1 Contaminated soil(control) | 23 | 6.63 | 307 |
| 4-2 reduced iron + compost | 0 | 7.58 | −537 |
| 4-3 scrap cast iron A + compost | 0 | 7.27 | −375 |
| 4-4 scrap cast iron B + compost | 16 | 7.25 | −229 |
| 4-5 scrap cast iron C + compost | 20 | 7.27 | −225 |

[a]tetrachloroethylene in the soil
[b]mg per 1 kilogram of dry soil

TABLE 8

Amounts of Gases in purifying Tetrachloroethylene in Soil by Scrap Cast Iron and so on.
(after 60 days of incubation)

|  | conversion rate[c] | $H_2$ (ml/kg)[b] | $CH_4$ (ml/kg)[b] | $CO_2$ (ml/kg)[b] |
|---|---|---|---|---|
| 4-1 Contaminated soil (control) | 0 | 0 | 0 | Trace |
| 4-2 reduced iron + compost | 79 | 3.4 | trace | 190 |
| 4-3 scrap cast iron A + compost | 73 | 2.3 | 0 | 243 |
| 4-4 scrap cast iron B + compost | 25 | 1.6 | 0 | 366 |
| 4-5 scrap cast iron C + compost | 7.6 | 1.8 | 0 | 414 |

[b]mg per 1 kilogram of dry soil
[c]conversion rate of ethylene and ethane from tetracloroethylene In Table 7, values in the column PCE, pH, and ORP are those after 60 days of incubation. In Table 8, the conversion rate of ethylene and ethane from tetrachloroethylene refers to a ration of the tetrachloroethylene which is converted into ethylene and ethane. Values in the column $H_2$, $CH_4$ and $CO_2$ show amounts of gases generated in a period of the incubation per 1 kilogram of the dry soil.

In the reaction systems where the reduced iron and the scrap cast iron A were used, tetrachloroethylene In the soil was purified to an undetected level.

The results show that, being similar to the reduced iron, the scrap cast iron dechlorinates tetrachloroethylene and converts into ethylene and ethane. Particularly, the use of the scrap cast iron A, which has small diameters very efficiently decompose tetrachloroethylene.

When the soil contaminated with tetrachloroethylene was purified by the scrap cast iron, pH of the soil remains about neutral and ranges from 7.2 to 7.3, and the oxidation reduction potential with respect to the saturated silver chloride electrode ranges from −225 to −375 mV which indicates maintaining a reducing environment. Therefore, the comparison of a purification process of soil using the reduced iron and a purification process of soil using the cast iron do not show substantial difference with respect to soil environment.

In all of the reaction systems which contains the medium for methane producing microorganisms, that is 4-2 to 4-5, a carbon dioxide gas was generated in the gas phase of the vials, suggesting that microorganisms grew therein. We may conclude that the scrap cast iron do not impede growth of microorganisms in soil.

Example 5

To the soil of Example 4, which was contaminated with tetrachloroethylene, was further added tetrachloroethylene to obtain soil samples having differing contents of tetrachloroethylene. Three samples having 50 milligram of tetrachloroethylene, 75 milligram of tetrachloroethylene, and 140 milligram of tetrachloroethylene per 1 kg of dry soil were obtained. Purification tests were conducted to each of the contaminated soil samples.

Similar to Example 4, 30 gram of each of the contaminated soil samples was added to each of vials having a volume of 125 ml, and 9.0 ml of the medium for methane producing microorganisms of Table 6, scrap cast iron A, which has a diameter up to 500 micrometers, and 1.5 gram of a compost from sewage sludge were added to the vial, and the decomposition of tetrachloroethylene was determined. During the preparation of the sample in each vial, the gas phase of the vial was replaced with a nitrogen gas.

The water content of the soil in each test system ranges from 48.4 to 48.9 percent. The water content herein is a value equal to [weight of water therein] divided by [a total weight of the wet contaminated matter] multiplied by 100.

In the experiments, the samples were incubated for 63 days at room temperature. Changes over a period were determined concerning pH of the contaminated soil, an oxidation reduction potential with respect to the saturated silver chloride electrode thereof, a decrease in tetrachloroethylene and amounts of ethylene and ethane formed in the gas phase.

Test Conditions 5-1: Control of contaminated soil having 50 milligram of tetrachloroethylene per 1 kilogram of dry soil (30 g)

5-2: Contaminated soil having 50 milligram of tetrachloroethylene per 1 kilogram of dry soil (30 g), a medium for methane producing microorganism (9.0 ml), scrap cast iron A (1.5 g), and a compost of sewage sludge (1.5 g)

5-3: Control of contaminated soil having 75 milligram of tetrachloroethylene per 1 kilogram of dry soil (30 g)

5-4: Contaminated soil having 75 milligram of tetrachloroethylene per 1 kilogram of dry soil (30 g), a medium for methane producing microorganism (9.0 ml), scrap cast iron A (1.5 g), and a compost of sewage sludge (1.5 g)

5-5: Control of contaminated soil having 140 milligram of tetrachloroethylene per 1 kilogram of dry soil (30 g)

5-6: Contaminated soil having 140 milligram of tetrachloroethylene per 1 kilogram of dry soil (30 g), a medium for methane producing microorganism (9.0 ml), scrap cast iron A (1.5 g), and a compost of sewage sludge (1.5 g)

The results of Example 5 are shown in Table 9.

TABLE 9

Results of Purifying Soil Highly Contaminated by
Tetrachloroethylene by Scrap Cast Iron
(after 63 days of incubation)

| | PCE$^a$ (mg/kg)$^b$ | conversion rate$^c$ (%) | pH | ORP (mV) |
|---|---|---|---|---|
| 5-1 Contaminated soil(control) | 45 | 0 | 6.71 | 360 |
| 5-2 scrap cast iron A +compost | 4.0 | 65 | 7.28 | −380 |
| 5-3 Contaminated soil(control) | 73 | 0 | 6.75 | 345 |
| 5-4 scrap cast iron A +compost | 19 | 58 | 7.19 | −375 |
| 5-5 Contaminated soil(control) | 139 | 0 | 6.86 | 336 |
| 5-6 scrap cast iron A +compost | 78 | 28 | 7.31 | −347 |

$^a$tetrachloroethylene in the soil
$^b$mg per 1 kilogram of dry soil
$^c$conversion rate of ethylene and ethane from tetrachloroethylene In the present invention, the use of a cast iron powder or a reduced iron powder allows to purify contaminated matter with a wide range of concentrations of halogenated organic compounds with a high purification rate. Use of cast iron, for example, scrap cast iron purify safely and conveniently matter contaminated with halogenated organic compounds with low cost. Moreover, the industrial waste may be recycled.

Furthermore, use of a soil improver having a low solubility allows to prevent releasing halogenated organic compounds from the contaminated matter. Moreover, the water holding ability of the soil can be suitably adjusted so that halogenated organic compounds do not penetrate into further depth in the ground.

Example 6

Example 6 corresponds to the second aspect of the present invention. Example 6 shows that it is capable of decomposing halogenated organic compounds without adding a nutritional source of heterotrophic anaerobic microorganisms.

In Example 6, as the reducing agents, (1) metallic iron (comparative example), (2), manganese, (3) an aluminum-silicon alloy, and (4) sodium hypophosphite (NaPH$_2$O$_2$) are used, and the results are compared.

Standard electrode potentials of the reducing agents are shown in Table 10.

TABLE 10

Standard Electrode Potential of Reducing Agents

| Reducing Agent | Standard Electrode Potential (mV) |
|---|---|
| (1) Metallic Iron | −440 |
| (2) Manganese | −1180 |
| (3) Aluminum-Silicon Alloy | −1600 |
| (4) Sodium hypophosphite | −499 |

To each of 6500 gram of soil originated from a loam bed, containing 150 milligram per kilogram of tetrachloroethylene and has a water content of 60 percent was added (1) 20 gram of metallic iron, (2) 10 gram of manganese, (3) 10 gram of aluminum-silicon alloy and (4) 20 gram of sodium hypophosphite (NaPH$_2$O$_2$), respectively, followed by maintaining temperature of 20° C. Following conditions were monitored.

In runs (2) and (3), oxidation reduction potentials reduced to not more than −500 mV within one hour, and maintained at not more than −500 mV in a period of 10 days therefrom. Tetrachloroethylene therein was completely dehalogenated into ethylene and ethane. In run (4), oxidation reduction potential reduced to not more than −450 mV within one hour, and maintained at not more than −450 mV in a period of 10 days therefrom. Tetrachloroethylene therein was completely dehalogenated into ethylene and ethane. In contrast, in run (1), it took five days to reduce oxidation reduction potential to −400 mV, and oxidation reduction potential was maintained at not more than −400 mV for a period of another five days therefrom. 20 percent of tetrachloroethylene was dehalogenated into ethylene and ethane within a total period of 10 days from the addition.

Example 7

(1) A system where a reducing agent was solely added, and where an organic carbon source was not added was compared with (2) a system where both the reducing agent and the organic carbon source were added. As the reducing agent, a calcium silicon alloy having a standard electrode potential of −1900 mV was used, and as the organic carbon source, sodium acetate was used.

To 65 kg of a clay soil having 200 milligram per kilogram of trichloroethylene and having a water content of 55 percent was added 100 gram of the calcium silicon alloy in the system (1) and (2). In the system (2), 70 gram of sodium acetate and 7 gram of nutritional salts were further added. Both systems were maintained at temperature of 20° C., and following conditions were monitored.

In both systems (1) and (2), oxidation reduction potentials reduced to not more than −500 mV within one hour. In system (1), the oxidation reduction potential was maintained at not more than −500 mV in a period of 10 days therefrom. Subsequently, the oxidation reduction potential gradually increases toward the oxidation side to the extent of 0 mV after a period of 40 days. 80 percent of trichloroethylene was reduced to ethylene and ethane while 20 percent thereof remained in the soil. On the other hand, in system (2), the oxidation reduction potential maintained at not more than −500 mV in a period of 40 days therefrom, and 99 percent of tetrachloroethylene therein was reduced into ethylene and ethane.

A surface of the reducing agent of the present invention is hardly coated by a stable oxidation film, and the reducing agent is easily dissolved to water, thereby facilitating a contact with contaminated matter and increasing a rate of decomposition. Even when the contaminated matter is clay soil or hardened siltstone, both of which have low water permeability, combination of the reducing agent and an organic carbon source, which serves as a growth substance for microorganisms, allows dehalogenation reactions.

Example 8

In Example 8, as the reducing agents, (1) metallic iron (control), (2) a powder of sodium hypophosphite ($NaPH_2O_2$), and (3) an aqueous solution of titanium citrate are used, and the results are compared.

Test Conditions

A loam soil having 120 milligram of tetrachloroethylene per kilogram upon conversion into dry soil was used. An initial oxidation reduction potential was +350 mV, and an amount of the soil was 100 m$^3$. In systems (2) and (3), oxidation reduction potentials reduced to not more than −450 mV within one hour, and the oxidation reduction potentials were maintained at not more than −450 mV in a subsequent period of 5 days. Trichloroethylene was dehalogenated into ethylene and ethane by the fifth day.

On the other hand, in system (1), one backhoe was used to mix the soil with the metal, and it took ten days to mix thereof. Subsequently, it took another five days until an oxidation reduction potential reduced to −400 mV, and the oxidation reduction potential maintained at not more than −400 mV in an additional period of 5 days therefrom. In the total period of 20 days, 20 percent of tetrachloroethylene therein was dehalogenated into ethylene and ethane.

Example 9

In either system, ascorbic acid was used as the reducing agent. In system (1), an organic carbon source was not added. In contrast, in system (2) sodium acetate as the organic carbon source was used.

A clay having 100 milligram of tetrachloroethylene per kilogram upon conversion into dry soil was used. An initial oxidation reduction potential was +320 mV, and an initial pH was 6.5.

Test Result

In both systems (1) and (2), oxidation reduction potentials were reduced to not more than +130 mV within one hour. In system (1), the oxidation reduction potential was maintained at not more than +130 mV in a period of 10 days therefrom. Subsequently, the oxidation reduction potential gradually increased toward the oxidation side to the extent of +300 mV after a period of 40 days. A pH of 6.3 on the initial day gradually decreased to pH of 5.5 after a period of 40 days. 50 percent of trichloroethylene was reduced to ethylene and ethane while 50 percent thereof remained in the soil.

On the other hand, in system (2), the oxidation reduction potential gradually decreased to the extent of not more than −150 mV after a period of 20 days, and maintained at not more than −150 mV in a period of 40 days therefrom. A pH of 7.5 on the initial day gradually decreased to pH of 6.8 after a period of 40 days. 99.9 percent of tetrachloroethylene therein was reduced into ethylene and ethane.

In these embodiments, the use of the water soluble reducing agents allows to effectively contact the reducing agent with matter contaminated with a halogenated compound, thereby promoting reductive dehalogenation reactions.

Moreover, the reducing agent in use for these embodiments has a standard electrode potential substantially equal to or smaller than metallic iron so as to increase a potential difference from the halogenated organic compound, thereby accelerating a rate of dehalogenation. Even when the contaminated matter is clay soil or hardened siltstone, both of which have low water permeability, combination of the reducing agent and an organic carbon source, which serves as a growth substance for microorganisms, allows dehalogenation reactions. Moreover, the reducing agent does not become passivated, contrary to metallic iron.

Example 10

Example 10 shows that a method of the present invention is capable of decomposing a halogenated aromatic compound.

To 6 kilogram of a loam soil having a concentration of 10 milligram per kilogram of pentachlorophenol, which is referred to as PCP, was added 20 gram of reduced iron. In system 10-1, one liter of a medium for nitrate reducing microorganisms of Table 11 was added thereto. On the other hand, in system 10-2, as a control, one liter of water was added thereto.

TABLE 11

| Medium for Sulfate Reducing Microorganisms | |
|---|---|
| component | amount |
| potassium nitrate | 4.5 g/l |
| potassium acetate | 8.5 g/l |
| sodium hydrogen carbonate | 5.0 g/l |
| magnesium chloride hexahydrate | 0.2 g/l |
| yeast extract | 0.1 g/l |
| diluting water | tap water |
| pH | 6.9~7.4 |

Subsequently, the mixture was mixed, and the resultant mixture was maintained at 28° C. Changes of a PCP concentration and a product concentration were monitored.

Results are shown in Tables 12 and 13.

TABLE 12

| Result of System 10-1 | | | |
|---|---|---|---|
| Compound | initial day | after 20 days | after 40 days |
| PCP (mg/kg) | 10.1 | 0.58 | 0.01 |
| TeCP (mg/kg) | 0.00 | 2.0 | 0.00 |
| CP (mg/kg) | 0.00 | 2.3 | 0.02 |
| Phenol | 0.00 | 1.2 | 3.1 |
| Eh (mV) | +312 | −380 | −423 |

TABLE 13

Result of System 10-2

| Compound | initial day | after 20 days | after 40 days |
|---|---|---|---|
| PCP (mg/kg) | 10.2 | 2.4 | 0.9 |
| TeCP (mg/kg) | 0.00 | 1.0 | 0.00 |
| CP (mg/kg) | 0.00 | 2.1 | 2.8 |
| Phenol | 0.00 | 0.8 | 1.0 |
| Eh (mV) | +308 | −170 | +118 |

In Tables 12 and 13, TeCP and CP are 2,3,5,6-tetrachlorophenol and 3-chlorophenol, respectively. Eh is a converted value of a standard electrode potential with respect to the standard hydrogen electrode.

In system 10-1, compared to system 10-2, pentachlorophenol was rapidly decomposed. It is believed that, in system 10-1, pentachlorophenol was decomposed into phenol by means of 2,3,5,6-tetrachlorophenol and/or 3-chlorophenol. 2,3,5,6-tetrachlorophenol and 3-chlorophenol were dehalogenated and did not accumulate. It is believed that phenol was decomposed into other compounds.

Example 11

Example 11 mainly corresponds to the third aspect of the present invention.

In Example 11, a medium for oxidized-nitrogen reducing microorganisms of Table 14 and a medium for methane producing microorganisms of Table 15 as a control were used to purify a soil contaminated with tetrachloroethylene. In Table 14, the oxidized form of nitrogen corresponds to 23 percent by weight of the organic carbon. The purification test was carried out at room temperature ranging from 12 to 23° C. for 30 days. Changes in properties of the soil were monitored, and results were shown in Table 16.

Prior to determining its pH, each soil sample was adjusted to have a ratio of the soil sample/pure water of being 1/1 by weight, and determined by a pH meter, HM-5B model produced by Toa Denpa Kogyo KK. Prior to determining an oxidation reduction potential with respect to the saturated silver chloride electrode, each soil sample was adjusted to have a ratio of soil sample/oxygen-free water of being 1/1 by weight. An electrode was dipped into a sample liquid for 30 minutes using an oxidation reduction potential meter UK-2030 from Central Science, and thereafter the ORP value of the sample was measured. An oxidation reduction potential with respect to the saturated silver chloride electrode in the present Example refers to a potential determined by a platinum electrode serving as a metal electrode and the saturated silver chloride serving as a comparing electrode.

To analyze ethylene chlorides present in soil, the method developed by the Yokohama National University (see K. Miyamoto et al.; "A Determination Method of Volatile Organic Pollutants in Soil", the Journal of Japan Society on Water Environment, Vol. 18, No. 6, pp. 477–488, 1995). Specifically, each soil sample was dipped in ethanol to extract ethylene and so on therefrom, and then the ethylene and so on obtained were further extracted with decane, and the solution of ethylene in decane was loaded into a column of Hitachi's G-5000 model for gas chromatography, in which the ethylene was analyzed by an FID detector. To determine ethylene and ethane gases generated in the gas phase, the gas phase comprising the gases was loaded into a column of Porapack Q column of Hitachi's G-5000 model for gas chromatography, in which said gases were analyzed by using an FID detector. To determine hydrogen, carbon dioxide and methane gases generated in the vapor gases, GL Sciences Gas Chromatography 320 model and TCD detector were used with active carbon 30/60 or Molecular Sieve 13 X. ion concentrations of a nitrate form of nitrogen and a nitrite form of nitrogen were determined by introducing an extract water being adjusted to have a ratio of the soil sample/pure water of being 1/1 by weight into Hitachi anion chromatography 2010i.

TABLE 14

Medium for Oxidized-Nitrogen Reducing Microorganisms

| component | amount |
|---|---|
| potassium nitrate | 4.5 g/l |
| potassium acetate | 8.5 g/l |
| sodium hydrogen carbonate | 5.0 g/l |
| magnesium chloride hexahydrate | 0.2 g/l |
| yeast extract | 0.1 g/l |
| diluting water | tap water |
| pH | 6.9~7.4 |

TABLE 15

Medium for Methane Producing Microorganisms

| Component | Amount |
|---|---|
| L-cysteine HCl Solution | 0.1 g/l |
| Polypeptone | 2.0 g/l |
| Glucose | 2.5 g/l |
| Sodium Citrate | 2.5 g/l |
| Methanol | 5.0 ml/l |
| Sodium Hydrogen Carbonate | 5.0 g/l |
| Sodium Sulfide Nonahydrate | 1.1 g/l |
| yeast extract | 1.0 g/l |
| Diluting Water | tap water |
| pH | 6.9~7.2 |

A purification test was conducted on a soil contaminated by tetrachloroethylene with a concentration of about 25 milligram per 1 kilogram of dry soil and collected from a surface layer of contaminated soil in a chemical factory. 30 gram of the contaminated soil was added to a vial of a volume of 50 ml, and then the medium and the metallic powder as mentioned below was mixed therewith. After a period of 30 days, changes of soil properties such as decomposition of tetrachloroethylene were determined as shown in Table 16.

As the metallic powder, Wako first class reduced iron from Wako Pure Chemical Industries Ltd., Japan was used. During the preparation of the sample, the gas phase of the vial was replaced with a helium gas.

Experimental Conditions 10-1 30 gram of contaminated soil 10-2 30 gram of contaminated soil, 9.0 ml of water and 0.07 gram of the reduced iron 10-3 30 gram of contaminated soil, 9.0 ml of the medium for oxidized-nitrogen reducing microorganisms, and 0.07 gram of the reduced iron 10-4 30 gram of contaminated soil, 9.0 ml of the medium for methane producing microorganisms, and 0.07 gram of the reduced iron The result is shown in Table 16. When the medium for oxidized-nitrogen reducing microorganisms was used, it was confirmed that tetrachloroethylene was dechlorinated into ethylene and ethane and that color change of the soil into black and generations of methane gas, mercaptan odor were prevented. It was found that generation of a nitrogen gas diluted a hydrogen gas. We found that nitrate and nitrite did not remain in the soil.

On the other hand, in the system that only the metal and water were added, pH drastically decreased, and the oxidation reduction potential with respect to the saturated silver chloride increased to +2 mV. As a result, a sufficient reductive dechlorination decomposition was not observed. A portion of tetrachloroethylene remained in the soil, and only 26 percent was converted into ethylene. Therefore, the result shows that it is difficult to maintain an appropriate reduction state over a long period of time in the system where only the metal powder was added and that the further addition of a nutritional agent and resultant biological reactions allow stable decomposition. In the system where only the metallic powder was added, a hydrogen gas of a concentration of about 100 percent was generated, and there was a risk of explosion. On the other hand, in the system where the medium for oxidized-nitrogen reducing microorganisms, a nitrogen gas was generated and diluted the hydrogen gas. Similarly, in the system where the medium for methane producing microorganisms was added, a methane gas was generated and diluted the hydrogen gas. Therefore, these systems are safer. However, in the system where the medium for methane producing microorganisms was added, an odor was generated, and color of the soil changed into black.

TABLE 16

Results of Purifying Tetrachloroethylene (PCE) in Soil (after 30 days of incubation)

|  | 10-1 | 10-2 | 10-3 | 10-4 |
|---|---|---|---|---|
| PCE in soil (mg-PCE/kg) | 22.5 | 8.6 | 0.0 | 0.0 |
| pH | 6.82 | 5.37 | 7.48 | 7.52 |
| ORP (mV) | +289 | +2 | −376 | −542 |
| Conversion rate of PCE to ethylene and ethane (%) | 0 | 26 | 81 | 84 |
| $H_2$ (ml/kg-soil) | 0.00 | 1.3 | 2.8 | 3.5 |
| $CH_4$ (ml/kg-soil) | 0.00 | 0.07 | 0.00 | 0.52 |
| $CO_2$ (ml/kg-soil) | 0.00 | 0.15 | 0.10 | 182 |
| $N_2$ (ml/kg-soil) | 0.05 | 0.04 | 110 | 0.01 |
| $NO_3$—N (ml/kg-soil) | 0.5 | 0.3 | 0.0 | 0.0 |
| $NO_2$—N (ml/kg-soil) | 0.0 | 0.0 | 0.0 | 0.0 |
| Odor | none | none | none | present |
| Coloration | none | a portion changed into pale black | changed into pale black | changed into dark brown |

In the third aspect of the present invention, use of the nutritional source containing an organic carbon and 20 to 50 percent by weight, based on the organic carbon, of an oxidized form of nitrogen prevents soil from changing to black and noxious gases such as mercaptan from being generated during decomposition of halogenated organic compounds.

Example 12

In Example 12, an organic carbon was supplied as a water soluble organic carbon source.

To 5 kilogram of each soil having a water content of 60 percent and having organic chlorinated compounds with a concentration of 10 milligram per kilogram was added 6 gram of (1) glucose, (2) morasses and (3) a compost, respectively. In addition, 200 milligram of nutritional salts were added to each soil sample, and a mixture was maintained at 28° C.

Subsequent conditions were monitored.

In systems (1) and (2), anaerobic microorganisms proliferated to $10^7$ microorganisms per gram of the soil in a period of several days. An oxidation reduction potential with respect to the saturated silver chloride electrode was maintained to not more than −600 mV in a period of 30 days, and tetrachloroethylene was dehalogenated into ethylene and ethane.

On the other hand, in system (3). it took 20 days to proliferate microorganisms to $10^7$ microorganisms per gram of the soil. The oxidation reduction potential increased after the $13^{th}$ day, and the oxidation reduction potential reaches to −23 mV at the $30^{th}$ day. 50 percent of tetrachloroethylene remained in the soil in a form of cis-dichloroethylene so that a complete dehalogenation was not achieved.

Example 13

To 200 kilogram of each soil having a water content of 65 percent and having halogenated organic compounds with a concentration of 30 milligram per kilogram was added 240 gram of glucose and 8 gram of nutritional salts were added. As a purification operation in winter, in system (1), the soil was surrounded by a polyvinyl house, and heated by warm water to an average temperature of 22° C.; and in system (2), the soil was stacked in open field.

In system (1), anaerobic microorganisms proliferated to $10^7$ microorganisms per gram of the soil in a period of several days. An oxidation reduction potential with respect to the saturated silver chloride electrode was maintained to not more than −600 mV in a period of 30 days, and tetrachloroethylene was dehalogenated into ethylene and ethane.

On the other hand, in system (3), it took 30 days to proliferate microorganisms to $10^7$ microorganisms per gram of the soil. The oxidation reduction potential increased after the $10^{th}$ day, and the oxidation reduction potential reaches to +52 mV at the $30^{th}$ day. 20 percent of tetrachloroethylene remained as it is in the soil, 40 percent of tetrachloroethylene remained in the soil in a form of cis-dichloroethylene.

Example 14

Example 14 mainly corresponds to the fourth aspect of the present invention.

Engineering work of purifying matter contaminated with halogenated organic compounds were carried out on the site.

Soil was extracted from the ground of a chemical plant, and transferred to a concrete pit. The soil was contaminated with tetrachloroethylene with an average concentration of about 11 milligram per kilogram of soil.

Engineering work was carried out on the soil in the following three processes.

Process 1

Using a backhoe, 5 m³ of the contaminated soil in the concrete pit was added to a bucket made of stainless steel having a volume of 10 m³, which serves as a container that does not leak water. Subsequently, 0.2 m³, which corresponds to 4 percent by volume of the soil, of a nutritional liquid, which is referred to as nutritional agent A, containing the medium for oxidized-nitrogen reducing microorganisms of Table 14 and the medium of methane producing microorganisms of Table 15, was added to the steel bucket, and then the soil was mixed with the nutritional agent A, using the backhoe. Then, 0.2 m³, which corresponds to 4 percent by volume of the soil, of the nutritional agent A was further added to the bucket, and the soil was mixed with the nutritional agent A, using the backhoe. Subsequently, 0.7 m³, which corresponds to 14 percent by volume of the soil, of the nutritional agent A, was added to the bucket, and the soil was mixed with the nutritional agent A. After the soil is sufficiently mixed with the nutritional agent A, reduced iron was distributed over the soil in the bucket, and further mixed therewith. The mixed soil was transferred back into the concrete pit.

Process 2

Using a backhoe, 5 m³ of the contaminated soil in the concrete pit was added to the aforementioned bucket made of stainless steel. Subsequently, 1.1 m³, which corresponds to 22 percent by volume of the soil, of the nutritional agent A was added to the bucket, and the soil was mixed with the nutritional agent A, using the backhoe. After the soil is sufficiently mixed with the nutritional agent A, reduced iron was added to all over the contaminated soil in the steel bucket, and further mixed therewith. The mixed soil was transferred back into the concrete pit.

Process 3

Using a backhoe, 5 m³ of the contaminated soil in the concrete pit was added to the aforementioned bucket made of stainless steel. Within fifteen to twenty hours from the addition, 0.2 m³, which corresponds to 4 percent by volume of the soil, of a suspension including the medium for oxidized-nitrogen reducing microorganisms of Table 14, the medium of methane producing microorganisms of Table 15, and reduced iron suspended therein was added to the bucket. The suspension is referred to a nutritional agent B hereinafter. The soil was mixed with the nutritional agent B, using the backhoe. Then 0.2 m³, which corresponds to 4 percent by volume of the soil, of the nutritional agent B was added to the bucket, and the soil was mixed with the nutritional agent B, using the backhoe. Subsequently. 0.7 m³, which corresponds to 14 percent by volume of the soil, of the nutritional agent B, was added to the bucket, and the soil was mixed with the nutritional agent B. After the soil is sufficiently mixed with the nutritional agent A, reduced iron was distributed over the soil in the bucket, and further mixed therewith. The mixed soil was transferred back into the concrete pit.

Portions of the soil mixed in processes 1 to 3 were screened through a screen with 10 mm meshes to determine an amount of lumps in the mixed soils by naked eyes. In processes 1 and 3, the mixed soils contained 1 to 10 percent of lumps in the soils. In contrast, the mixed soil of process 2 contained 15 to 30 percent by lumps in the soil. The results show that a degree of mixture depends on a method of adding a nutritional liquid and a method of mixing thereof.

In any of processes of 1 to 3, after the mixture, all of the upper surfaces of the soil in the concrete pit was covered by a polyvinyl sheet and the polyvinyl sheet was fixed by a steel plate so that oxygen transfer with the external environment was prevented. Alternatively, instead of covering with the polyvinyl sheet, water may be added to immerse the soil such that the water level is higher by 5 to 15 centimeter than the upper surface of the soil so that oxygen transfer with the external environment is prevented and that a water content in the soil is sufficiently maintained.

In any of processes 1 to 3, the soil was transferred back into the concrete pit for preventing tetrachloroethylene eluting away. In actual practice, the contaminated soil from the ground may be added to a bucket, and the contaminated soil may be mixed with a nutritional liquid in the bucket, and then the mixture may be transferred back into a pit, which was formed by removing the contaminated soil. Alternatively, instead of mixing in the bucket, the soil may be mixed in the ground on the spot.

After covering the soil by the polyvinyl sheet for two months, a tetrachloroethylene concentration in the soil was determined. The results are shown in Table 17.

| Period | Process 1 | Process 2 | Process 3 |
|---|---|---|---|
| PCE concentration (mg/l) on the initial day | 5 | 5 | 5 |
| PCE concentration (mg/l) after two months | 0.01 | 0.55 | 1.9 |
| decomposition rate (%) | 99.8 | 89 | 62 |

In the soil mixed in the process 1, 2, and 3, 99.8 percent, 89 percent, and 62 percent of tetrachloroethylene was decomposed, respectively. The result of process 1 shows that additions of the nutritional agent at a plurality of times and mixing for each time increases decomposition rate. The result of process 2 shows that an addition of a reducing agent in a powder form subsequent to mixing the soil with the nutritional liquid increase the decomposition rate.

What is claimed is:

1. A method for purifying matter contaminated with a halogenated organic compound, which method comprises the step of:

adding a reducing agent and a nutritional source for a heterotrophic anaerobic microorganism to the contaminated matter, the reducing agent having a standard electrode potential ranging from 130 mV to −2400 mV at 25° C. with respect to the standard hydrogen electrode, the nutritional source containing an organic carbon and 20 to 50 percent by weight, based on the organic carbon, of an oxidized form of nitrogen.

2. A method of claim 1 wherein the nutritional source contains 20 to 30 percent by weight, based on the organic carbon, of the oxidized form of nitrogen.

3. A method of claim 1 wherein the organic carbon is supplied as a water soluble organic carbon source.

4. A method of claim 1 wherein the reducing agent is a metal having a standard electrode potential ranging from −400 mV to −2400 mV at 25° C. with respect to the standard hydrogen electrode.

5. A method of claim 1 wherein the reducing agent is at least one species selected from the group consisting of reduced iron, cast iron, an iron-silicon alloy, a titanium alloy, a zinc alloy, a manganese alloy, an aluminum alloy, a magnesium alloy, a calcium alloy and a water soluble compound.

6. A method of claim 1 wherein the reducing agent is a water soluble compound.

7. A method of claim 1 wherein the reducing agent is a powder having a diameter up to 500 μm.

* * * * *

UNITED STATES PATENT AND TRADEMARK OFFICE
CERTIFICATE OF CORRECTION

PATENT NO.    : 6,303,367 B1
DATED         : October 16, 2001
INVENTOR(S)   : Naoaki Kataoka et al.

It is certified that error appears in the above-identified patent and that said Letters Patent is hereby corrected as shown below:

<u>Title page,</u>
Foreign Application Priority Data, the information for the fourth listed priority application should read as follows:
Oct. 7, 1997    (JP) ...................................................... 9/274575

Signed and Sealed this

Twenty-sixth Day of March, 2002

Attest:

JAMES E. ROGAN
*Attesting Officer*    *Director of the United States Patent and Trademark Office*